United States Patent
Abdelghaffar et al.

(10) Patent No.: US 12,438,585 B2
(45) Date of Patent: Oct. 7, 2025

(54) ENHANCED UPLINK EMISSION CAPABILITY FOR SUBBAND FULL DUPLEX

(71) Applicant: QUALCOMM Incorporated, San Diego, CA (US)

(72) Inventors: Muhammad Sayed Khairy Abdelghaffar, San Jose, CA (US); Abdelrahman Mohamed Ahmed Mohamed Ibrahim, San Diego, CA (US); Ahmed Attia Abotabl, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 555 days.

(21) Appl. No.: 17/891,016

(22) Filed: Aug. 18, 2022

(65) Prior Publication Data

US 2024/0063873 A1 Feb. 22, 2024

(51) Int. Cl.
*H04B 7/06* (2006.01)
*H04B 1/525* (2015.01)
*H04L 5/00* (2006.01)
*H04L 5/14* (2006.01)

(52) U.S. Cl.
CPC .......... *H04B 7/0628* (2013.01); *H04B 1/525* (2013.01); *H04L 5/0094* (2013.01); *H04L 5/14* (2013.01)

(58) Field of Classification Search
None
See application file for complete search history.

(56) References Cited

U.S. PATENT DOCUMENTS

| | | | |
|---|---|---|---|
| 2014/0153498 A1* | 6/2014 | Rousu | H04L 5/0073 370/329 |
| 2021/0360670 A1 | 11/2021 | Huang et al. | |
| 2021/0377926 A1* | 12/2021 | Li | H04L 5/0053 |
| 2021/0400637 A1 | 12/2021 | Abotabl et al. | |

OTHER PUBLICATIONS

International Search Report and Written Opinion—PCT/US2023/072315—ISA/EPO—Dec. 07, 2023.
Lenovo, et al., "Full Duplex Cell Operation in NR", 3GPP TSG RAN Rel-18 Workshop, RWS-210397, 3rd Generation Partnership Project, Mobile Competence Centre, 650, Route Des Lucioles, F-06921 Sophia-Antipolis Cedex, France, vol. TSG RAN, No. Electronic Meeting, 20210628-20210702, Jun. 7, 2021, 5 Pages, XP052025950, p. 2-p. 3.

* cited by examiner

*Primary Examiner* — Minh T Nguyen
(74) *Attorney, Agent, or Firm* — Patterson + Sheridan, L.L.P.

(57) ABSTRACT

Certain aspects of the present disclosure provide a method for wireless communications by a user equipment (UE) generally including transmitting, to a network entity, capability information indicating a capability of the UE for uplink subband filtering, receiving signaling scheduling an uplink transmission from the UE in a subband full duplex (SBFD) slot on resources determined based on the indicated capability, and transmitting the uplink transmission in the SBFD slot with uplink subband filtering, in accordance with the scheduling.

35 Claims, 20 Drawing Sheets

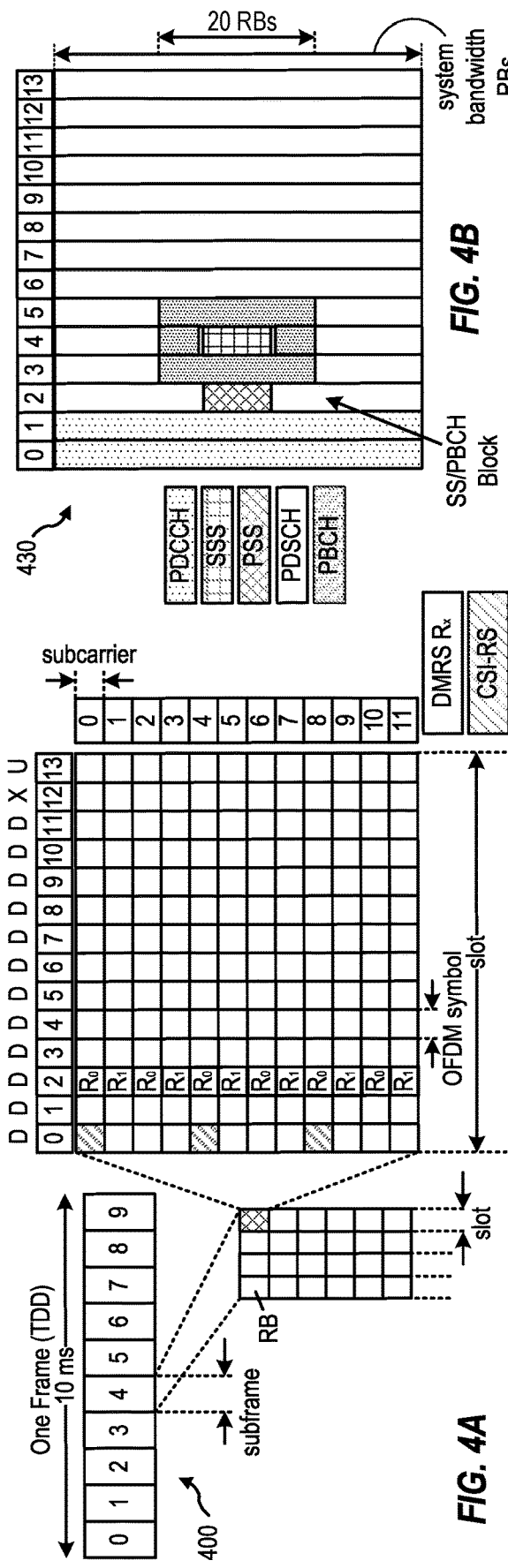
FIG. 4A
FIG. 4B
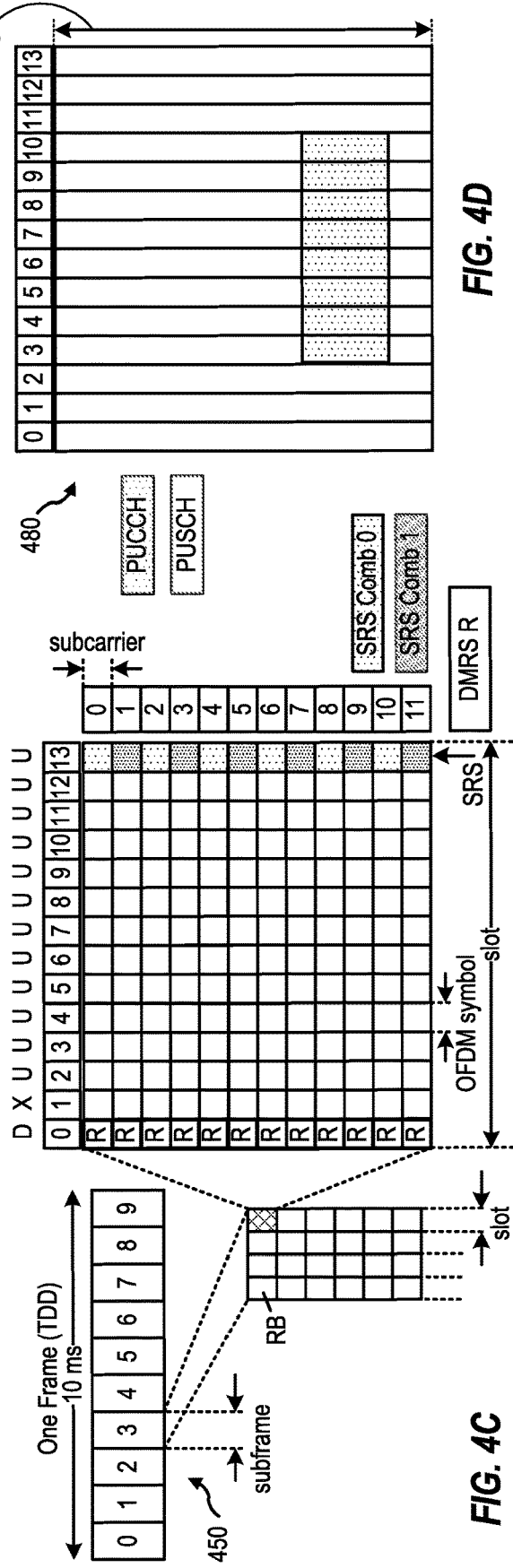
FIG. 4C
FIG. 4D

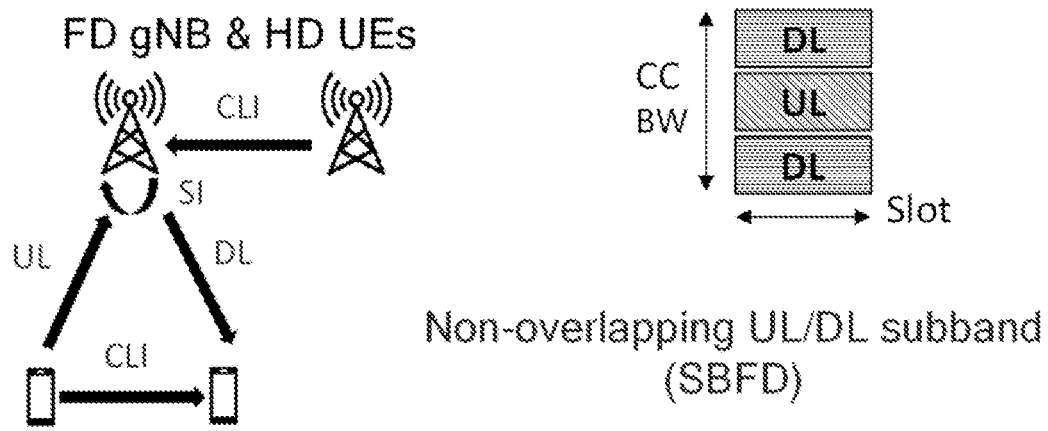
FIG. 6A
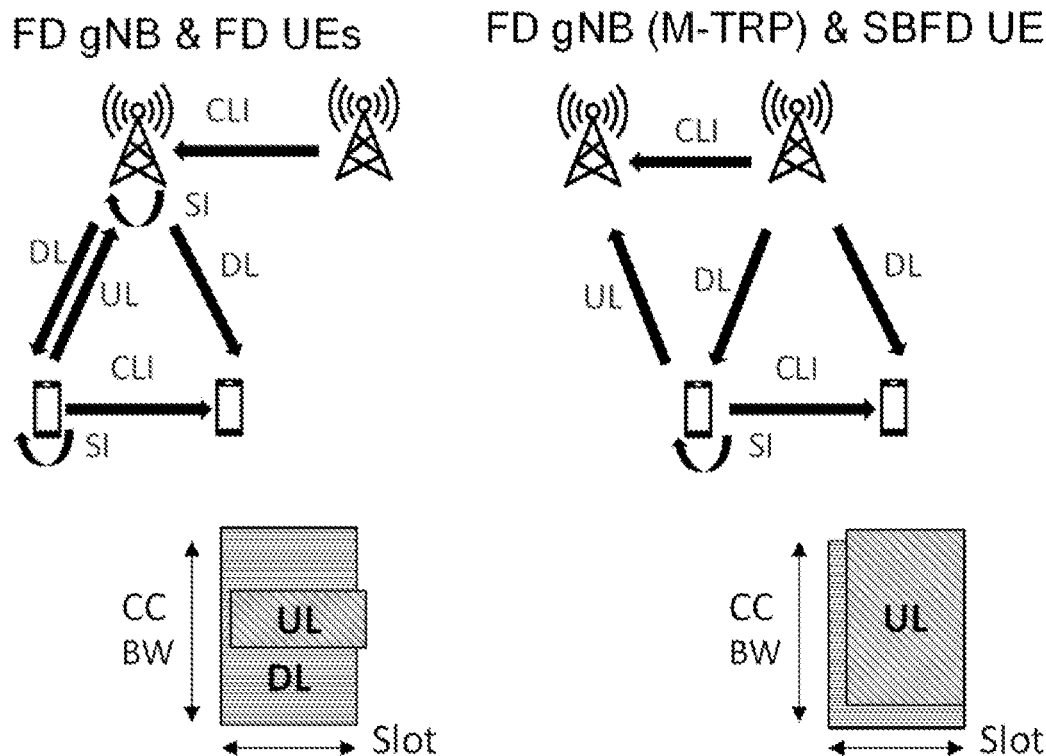
FIG. 6B
FIG. 6C

ENHANCED UPLINK EMISSION CAPABILITY FOR SUBBAND FULL DUPLEX

BACKGROUND

Field of the Disclosure

Aspects of the present disclosure relate to wireless communications, and more particularly, to techniques for managing uplink emissions in subband full duplex (SBFD) slots.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE). The method includes transmitting, to a network entity, capability information indicating a capability of the UE for uplink subband filtering; receiving signaling scheduling an uplink transmission from the UE in a subband full duplex (SBFD) slot on resources determined based on the indicated capability; and transmitting the uplink transmission in the SBFD slot with uplink subband filtering, in accordance with the scheduling.

Another aspect provides a method for wireless communications by a network entity. The method includes receiving capability information indicating a capability of a UE for uplink subband filtering; transmitting signaling scheduling an uplink transmission from the UE in a SBFD slot on resources determined based on the indicated capability; and processing the uplink transmission in the SBFD, in accordance with the scheduling.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIGS. 6A, 6B, and 6C depict various examples of full duplex configurations.

DETAILED DESCRIPTION

Aspects of the present disclosure provide apparatuses, methods, processing systems, and computer-readable mediums for subband filtering by a user equipment (UE).

The term full duplex (FD) describes simultaneous data transmission and receptions over one channel. An FD device is, thus, capable of bi-directional network data transmissions at the same time. In contrast, a half-duplex (HD) devices can only transmit in one direction at one time. With HD mode, data can move in two directions, but not at the same time.

If a user equipment (UE) is operating in HD mode and a gNodeB (gNB) is operating in sub-band FD (SBFD) or in-band FD (IBFD), interference may occur at the UE from a number of sources. For example, this interference may include inter-cell interference (ICI) from other gNBs, intra-cell cross-link interference (CLI) from UEs in the same cell, and inter-cell CLI from UEs in adjacent cells. Self-interference may also occur for FD UEs, where a UEs uplink transmission interference with reception of a downlink transmission. These sources of interference may cause significant issues, including decreased spectral efficiency, increased power consumption, and poor UE performance.

Aspects of the present disclosure provide techniques that may help mitigate such potential sources of interference, through the use of subband filtering at a UE. The techniques presented herein may have significant benefits. For example, the subband filtering proposed herein may allow a network to have greater flexibility in scheduling, given the potential to reduce interference, leakage, and subband emissions (SBE).

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
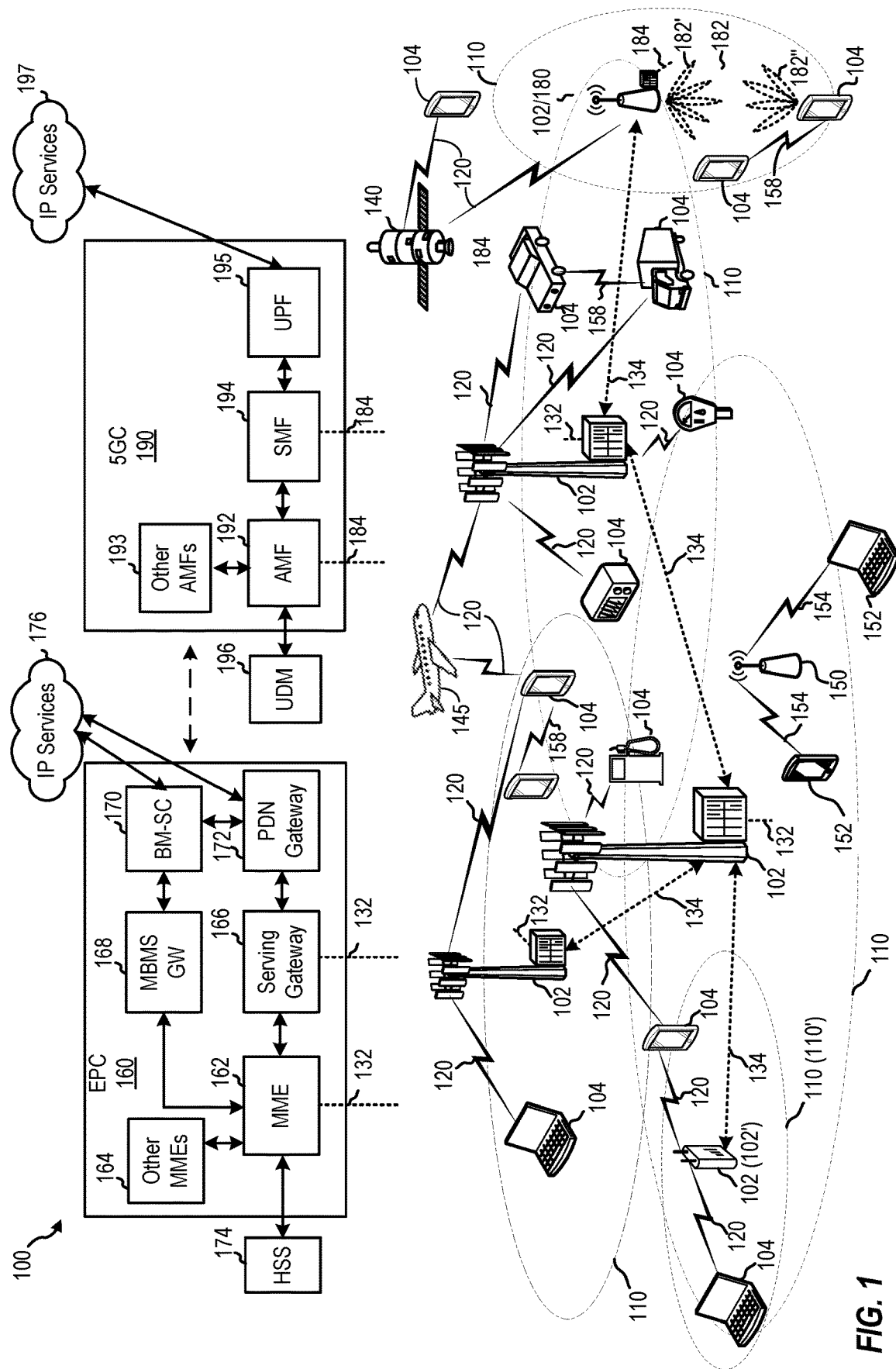
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
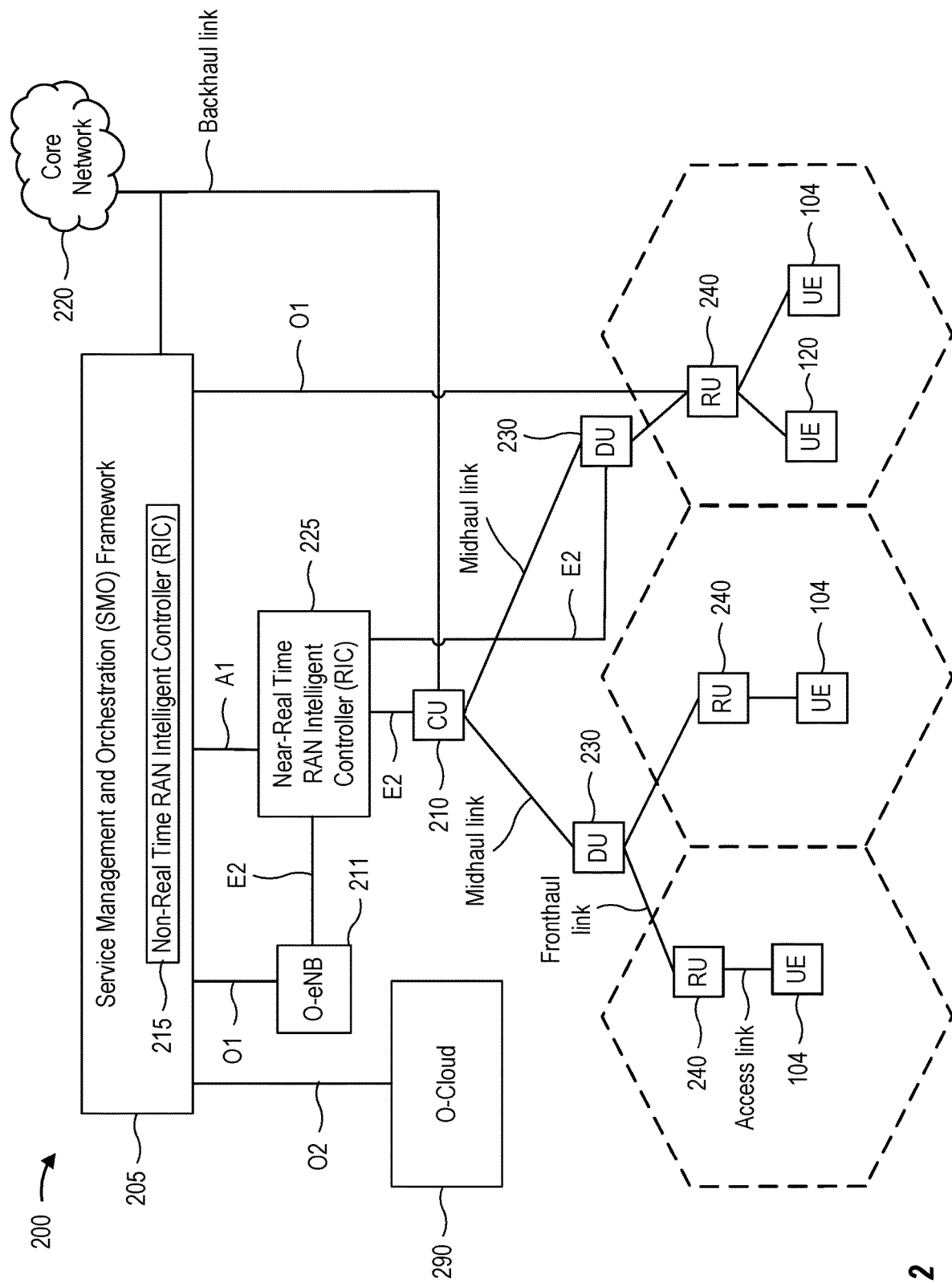
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG- RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
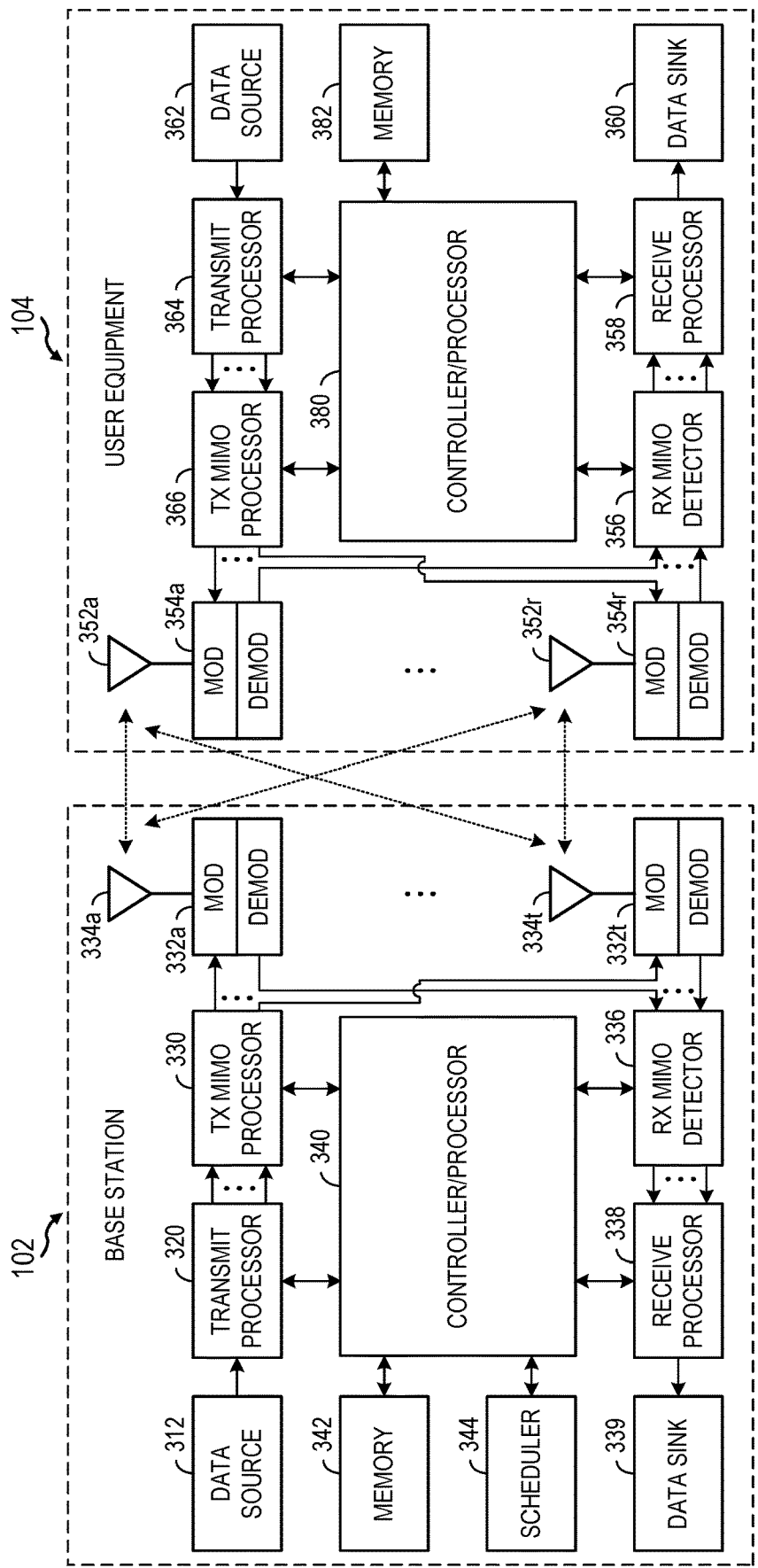
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu \times 15}$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Full Duplex Communication

As noted above, full-duplex (FD) device is capable of bi-directional network data transmissions at the same time. In contrast, a half-duplex (HD) devices can only transmit in one direction at one time. With HD mode, data can move in two directions, but not at the same time.

Figure 5A:
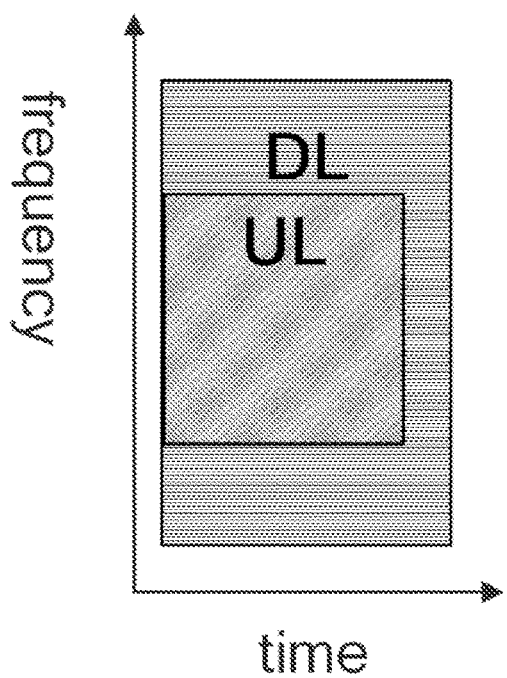
FIGS. 5A, 5B, and 5C depict various examples of full duplex time/frequency resource configurations.
Figure 5B:
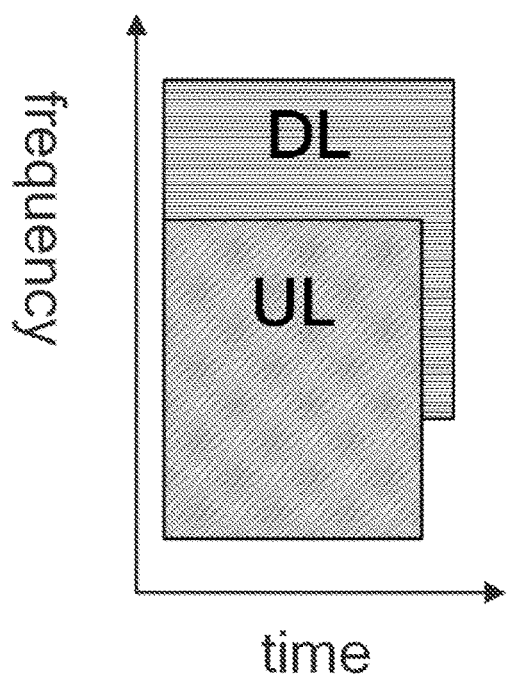

Examples of FD communication include in-band FD (IBFD) and sub-band FD. As illustrated in FIGS. 5A and 5B, with IBFD, a device may transmit and receive on the same time and frequency resources. In this case, the downlink (DL) and uplink (UL) shares the same IBFD time and frequency resources which may fully overlap (FIG. 5A) or partially overlap (FIG. 5B).

Figure 5C:
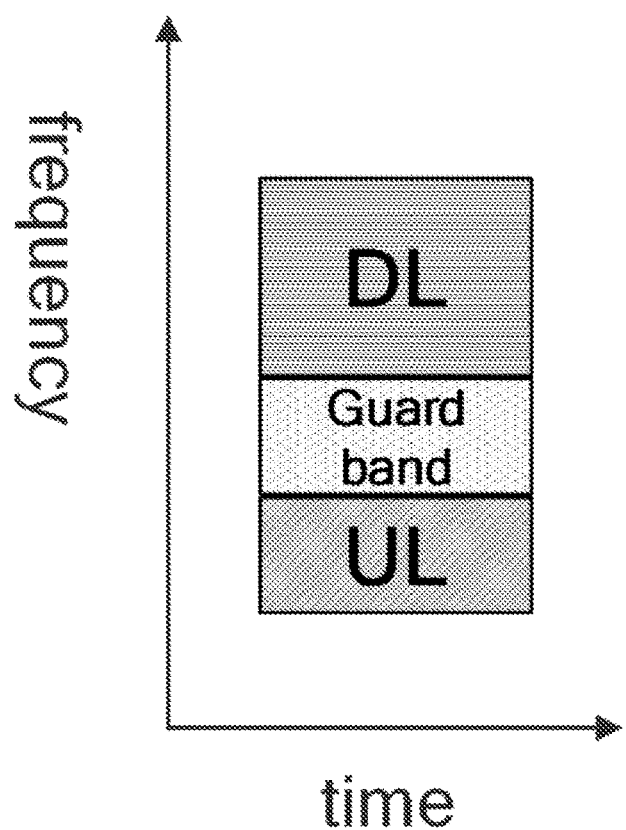

As shown in FIG. 5C, with SBFD (also referred to a flexible duplexing), a device may transmit and receive at the same time, but using different frequency resources. In this case, the DL resource may be separated from the UL resource, in frequency domain, by a guard band.

Interference to a UE and/or a network entity (e.g., a base station such as a gNB or node of a disaggregated base station) operating in FD mode may come in the form of CLI from neighboring nodes, as well as self-interference (SI). FIG. 5A, FIG. 5B, FIG. 5C, and FIG. 5D illustrate example interference scenarios for various FD communication use cases.

As illustrated in FIG. 6A, a first scenario is when FD is enabled for a gNB (e.g., with non-overlapping UL/DL subbands) but disabled for each connected UE (which in turn may be enabled for half-duplex (HD) communication), a gNB communicates using FD capabilities. In this case, CLI between UEs, SI from the FD gNB, and CLI between the gNB and neighboring gNBs interferes with FD communication.

As illustrated in FIG. 6B, a second scenario is when FD is enabled for both a gNB and a FD UE/customer premise equipment (CPE) connected to the gNB, the gNB communicates with the FD UE using FD capabilities. If the gNB is connected to a HD UE alongside the FD UE, the gNB communicates with the HD UE. In this case, CLI between UEs, SI from the gNB and the FD UE, and CLI between the FD gNB and neighboring gNBs interferes with FD communication.

As illustrated in FIG. 6C, a third scenario is when FD is enabled for two gNBs (e.g., in a multiple TRP scenario) and enabled at one UE/CPE connected to the two gNBs. in this case, the two gNBs may communicate with the FD UE using FD capabilities. If one of the two gNBs is connected to an HD UE alongside the FD UE, the one gNB communicates with both the HD UE and the FD UE. In this case, CLI between UEs, SI from the FD UE, and CLI between the two gNBs may interfere with FD communication.

Figure 7A:
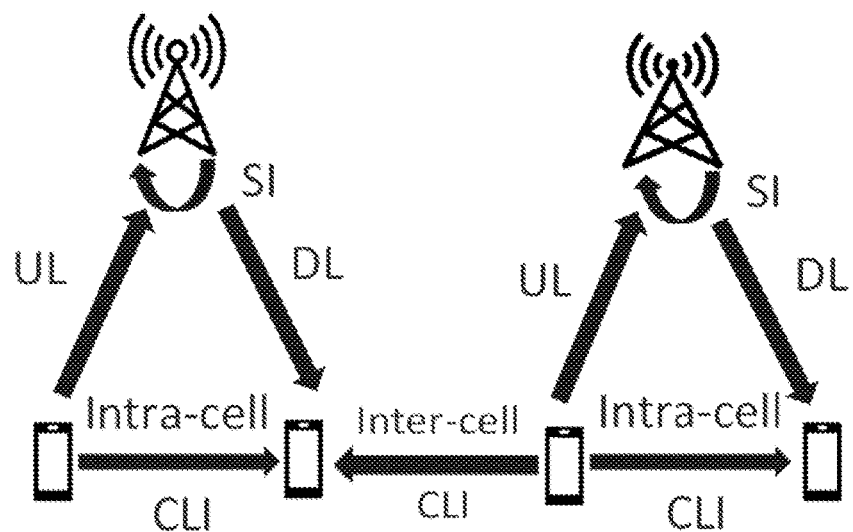
FIGS. 7A and 7B depict an example of inter-UE cross link interference (CLI).
Figure 7B:
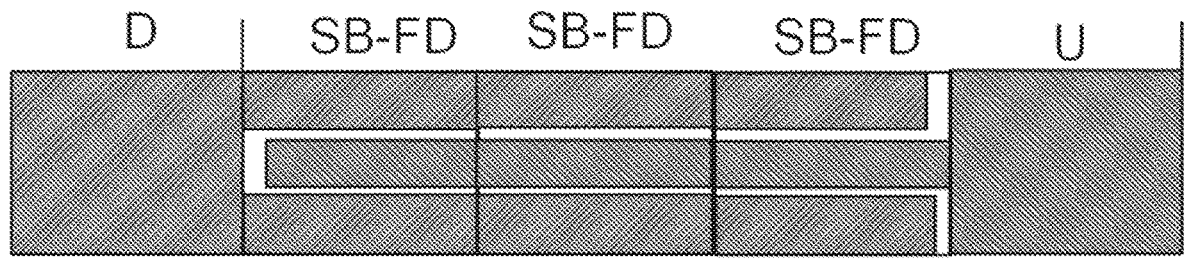

FIG. 7A also illustrates various forms of interference for FD communications. As illustrated, if a UE is operating in HD mode and the gNB is operating in FD (mode) SBFD/IBFD, source of interference at the UE include inter-cell interference from other gNBs, intra-cell CLI from UEs in the same cell, and inter-cell CLI from UEs in adjacent cells. Additionally, there may be self-interference for full-duplex UEs, particularly in SBFD slots that include both uplink and downlink subbands, as shown in FIG. 7B.

Enhanced UL Emission Capability for Subband Full Duplex

Intra-cell and inter-cell inter-UE interference between aggressor UL UE(s) and victim UE(s) receiving downlink (DL) communication may affect the DL reception of a victim UE in various ways. For example, the receiver automatic gain control (Rx AGC) may be biased by the interfering signal which could have high strength (RSSI) as compared to the DL signal.

This interference may have multiple adverse effects, such as: 1) increasing the noise figure as UE will operate at higher gain state and 2) reducing the dynamic range of the DL signal; and 3) reducing the DL SINR due to the presence of the leakage within the DL subband. In some scenarios, when the interference signal level is so high, this may lead to blocking of the radio frequency front end (RFFE) and the UE may be incapable of receiving the DL signal.

Aspects of the present disclosure, however, may help avoid such interference, for example, by utilizing RF subband filters (duplexer) at the UE-side. The subband filters may operate within the component carrier (CC) bandwidth (BW) to reduce the emission to the adjacent subband within the CC.

Techniques proposed herein may help reduce inter-UE CLI by means of cleaner/reduced emission of an aggressor UE. Techniques proposed herein also include RF features and UE capability for inter-SB CLI mitigation.

Figure 8:
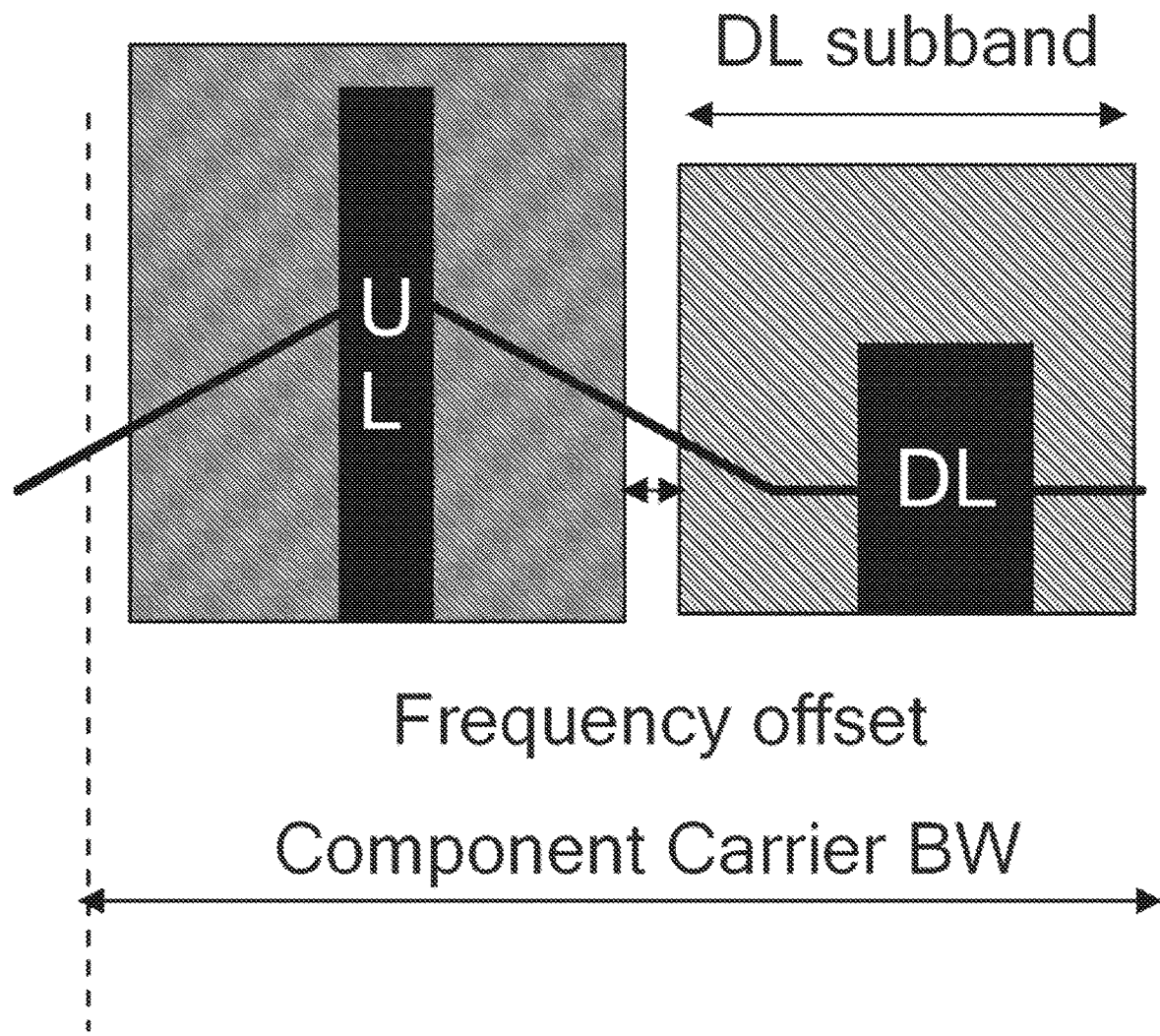
FIG. 8 depicts an example of subband emission.

The techniques may also help meet certain requirements defined for co-channel emission. For example, as illustrated in FIG. 8, such requirements may include UE transmit side (Tx-side) inter-band emission (IBE) or subband emission (SBE) designed to control the unwanted emission of UL UE Tx on certain resource blocks (RBs) to other RBs. In some cases (e.g. in a TDD slot), a network entity (e.g., gNB) may allocate the other RBs to receive UL transmissions from other UEs that are frequency division multiplexed (FDMed) in the same component carrier (CC). In subband full duplex, the other adjacent RBs may be used for downlink reception by other UEs. A requirement of inter-subband emission may be tighter than a current IBE requirement to reduce out-of-subband emissions and leakage to other UEs who receive DL signals in the adjacent subband.

Figure 9A:
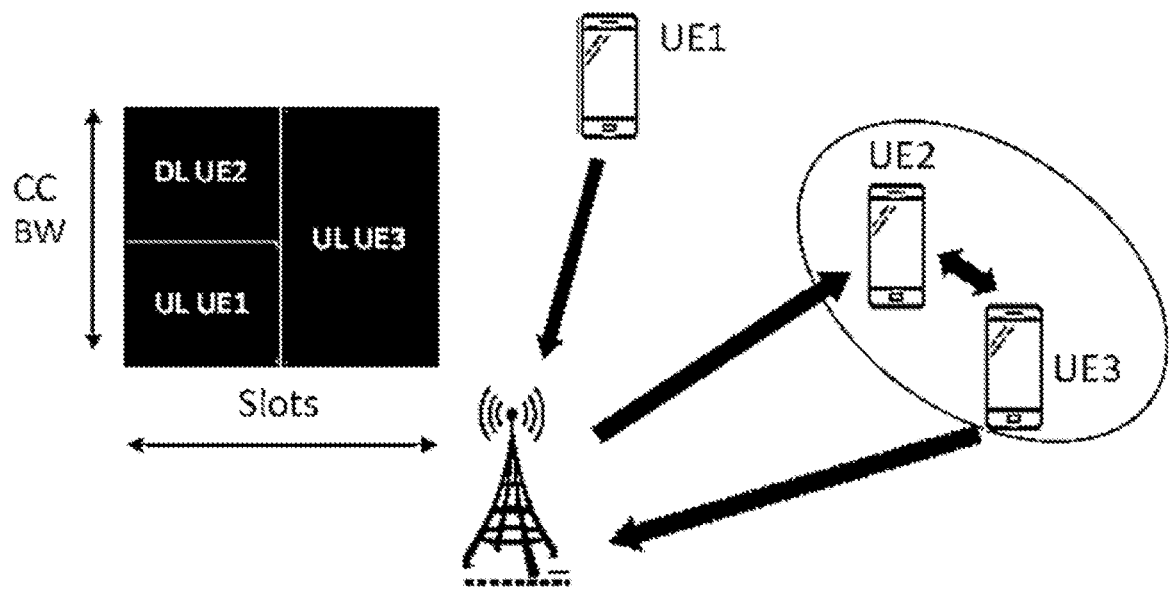
FIGS. 9A and 9B depict examples of subband full duplex (SBFD) scheduling scenarios.
Figure 9B:
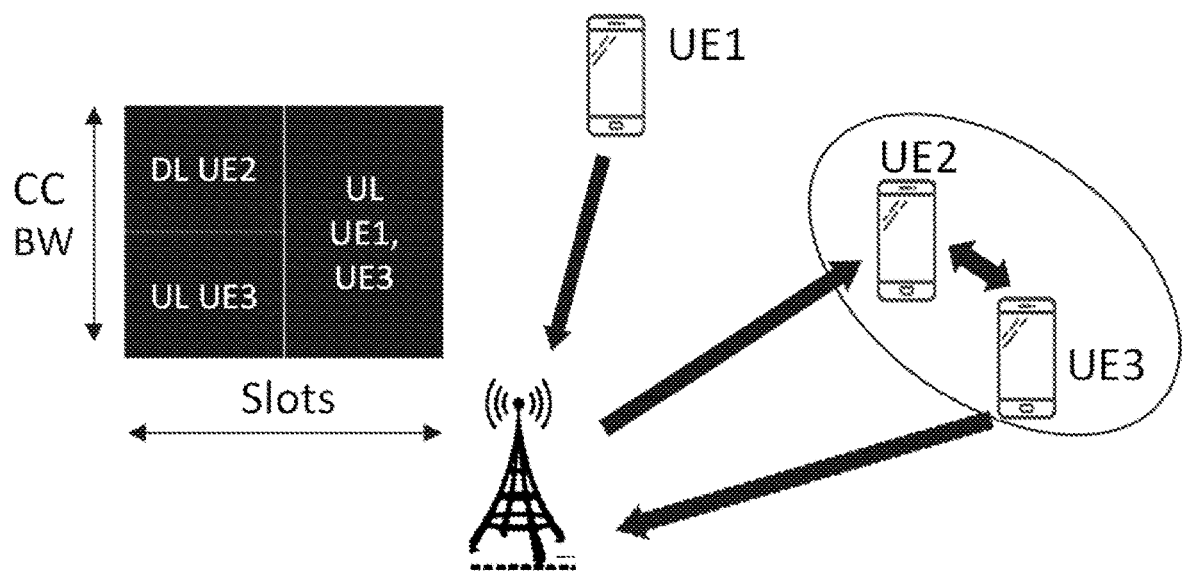

The techniques proposed herein may help address the scenarios, illustrated in FIGS. 9A and 9B where three UEs (UE2, UE2, and UE3) are in proximity to each other and could be subject to CLI. In a conventional system, without deploying UE subband duplexers, UE3 may not be able to be scheduled within an SBFD slot.

By reducing adjacent subbands emissions, the UE subband filtering proposed herein may provide flexibility for scheduling uplink and downlink transmissions (e.g., in SBFD logs) to different UEs, in such scenarios.

A UE may indicate its capability of uplink transmission subband filtering to the network. Knowledge of this capability may facilitate UE scheduling by the network while reducing inter-UE CLI. For example, the capability to perform subband filtering may determine whether a UE can be scheduled within the UL subband and which RBs (edge, center) and guard band may be needed to schedule other DL UEs. For example, an advanced UE with subband Tx filtering capability, may be safely assigned edge RBs with little (or zero) guard band to DL UEs.

In addition, knowledge of a UE capability for Tx subband filtering may reduce the burden of CLI measurements and reporting by UEs. Further, knowledge of UE capability for Tx subband filtering may help meet requirements for proper DL reception within the existence of potential inter-UE CLI.

Figure 10A:
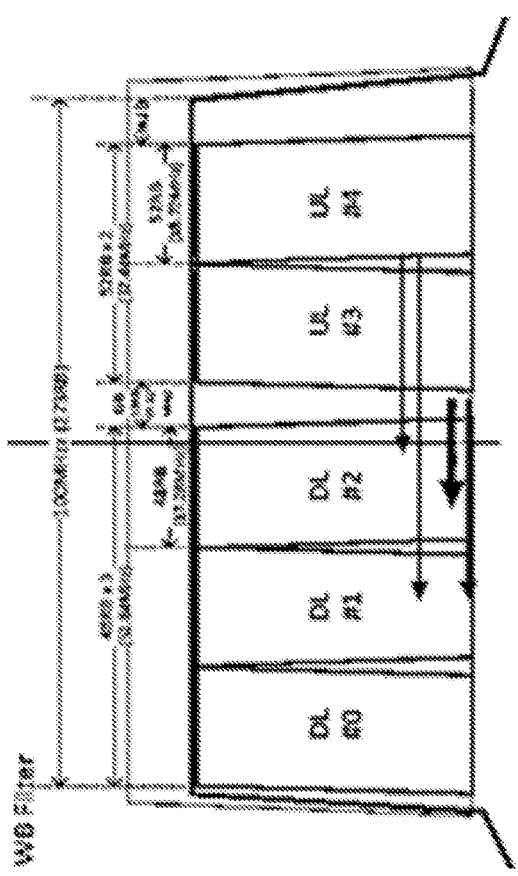
FIGS. 10A, 10B and 10C depict examples of subband filtering.
Figure 10C:
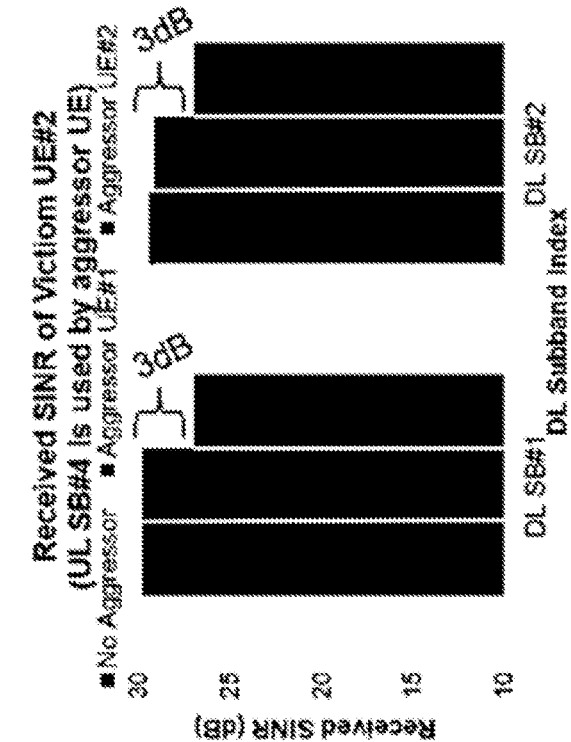
Figure 10B:
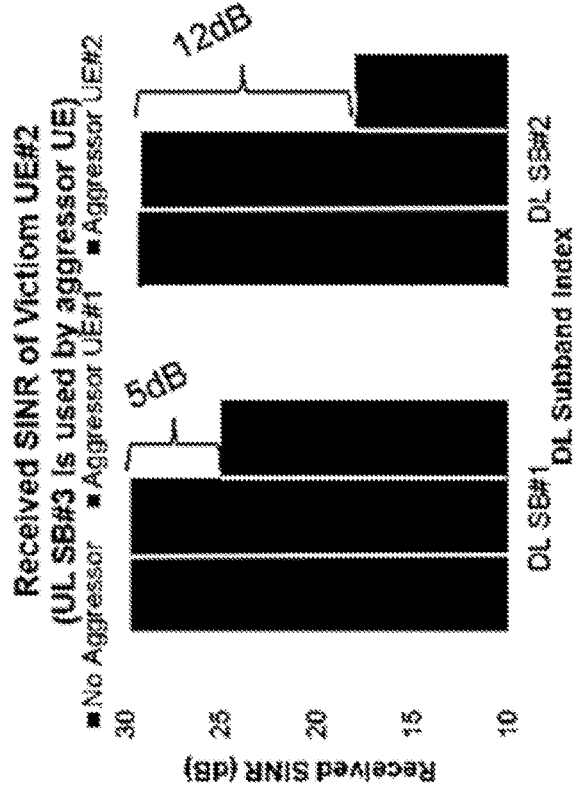

The impact of adjacent transmissions may be understood with reference to FIGS. 10A, 10B, and 10C. As illustrated in FIG. 10A, three subbands 0-2 may be allocated for downlink, while two adjacent subbands 3-4 may be allocated for uplink. FIGS. 10B and 10C illustrate the potential impact of received SINR of a downlink subband of a victim UE (UE2) when an aggressor transmits on adjacent subbands. As illustrated in FIG. 10B, the reduction in received SINR may be significant (e.g., 5-12 dB) if the uplink transmission is on an immediately adjacent subband. As illustrated in FIG. 10C, the reduction in received SINR may still be significant (e.g., 3 dB) if the uplink transmission is not immediately adjacent.

Figure 11:
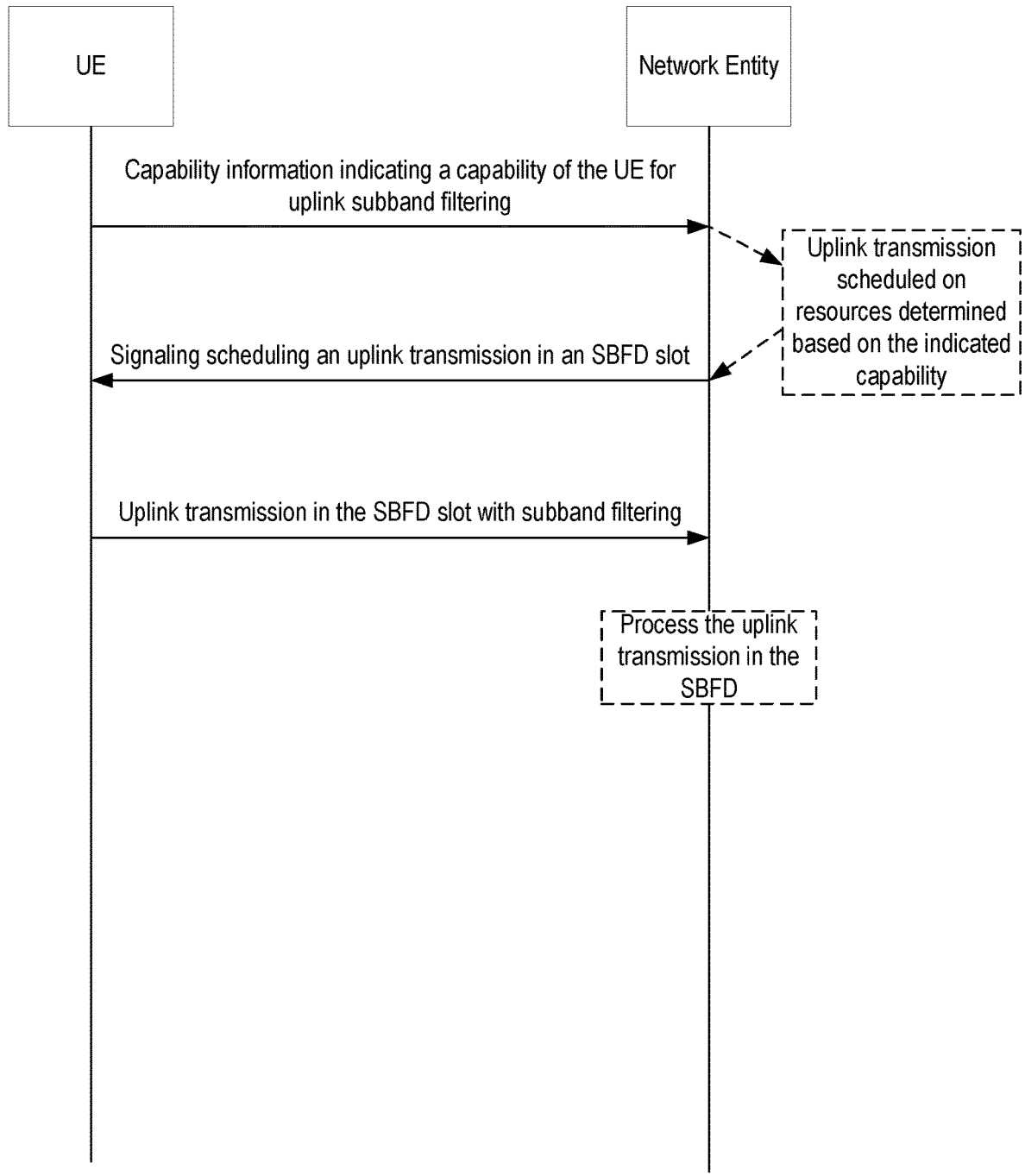
FIG. 11 depicts an example call flow diagram, in accordance with aspects of the present disclosure.

Aspects of the present disclosure, utilizing UE subband filtering, may be understood with reference to the call flow diagram 1100 of FIG. 11. As illustrated, a UE may indicate its capability for uplink subband filtering. The network may use this information to schedule uplink transmissions, in an SBFD slot, for the UE (and downlink transmissions to other UEs). The UE may then transmit the scheduled uplink transmission, applying uplink subband filtering.

Figure 12A:
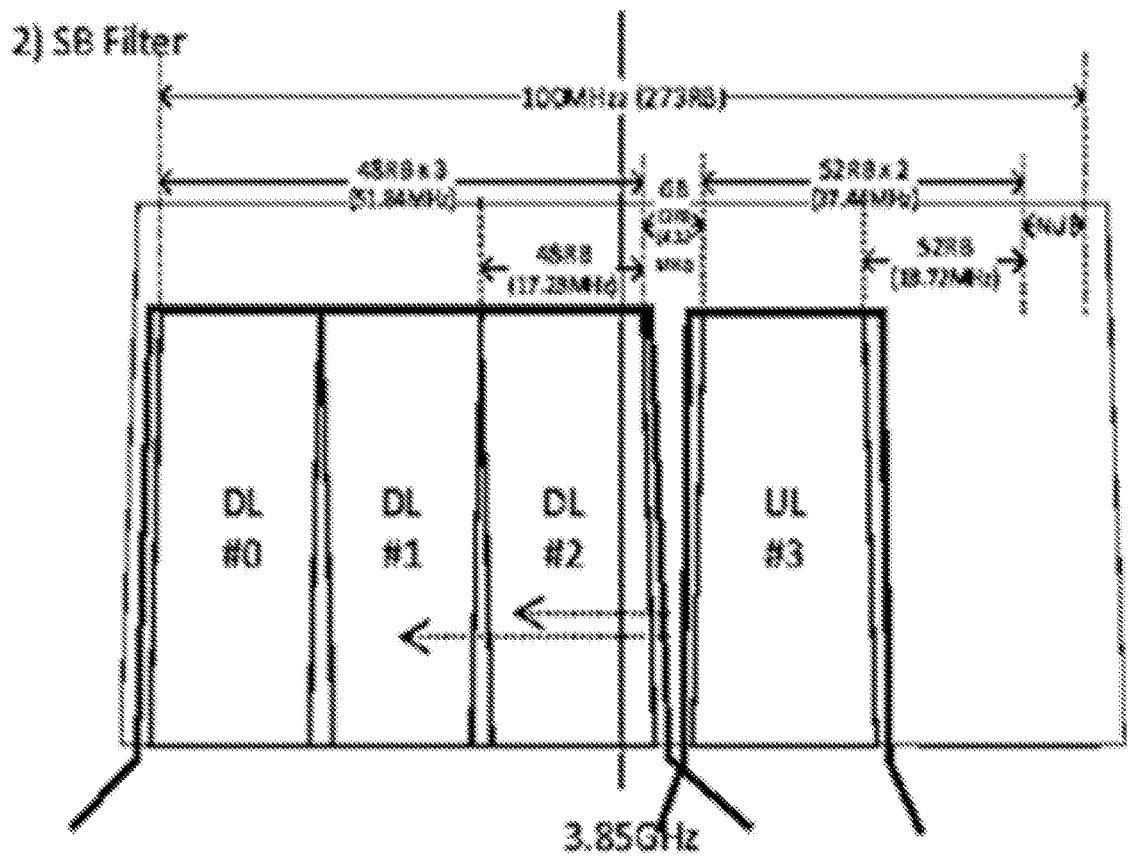
FIGS. 12A and 12B depict examples of subband filtering, in accordance with aspects of the present disclosure.
Figure 12B:
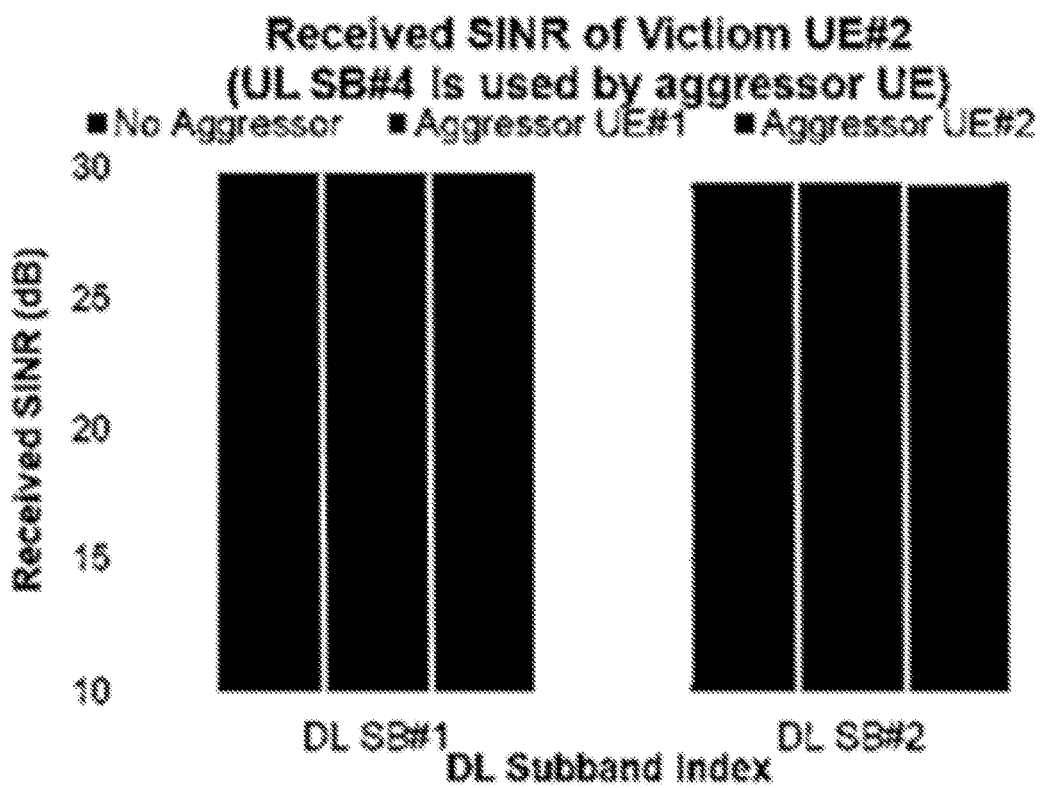

FIG. 12 illustrates how the application of subband Tx filtering at the UE may impact received SINR of other UEs. Rather than degrade SINR, as shown in FIGS. 11A and 11B, by applying Tx subband filtering, uplink transmissions of the UE may not reduce the DL SINR of other UEs at all.

Figure 13:
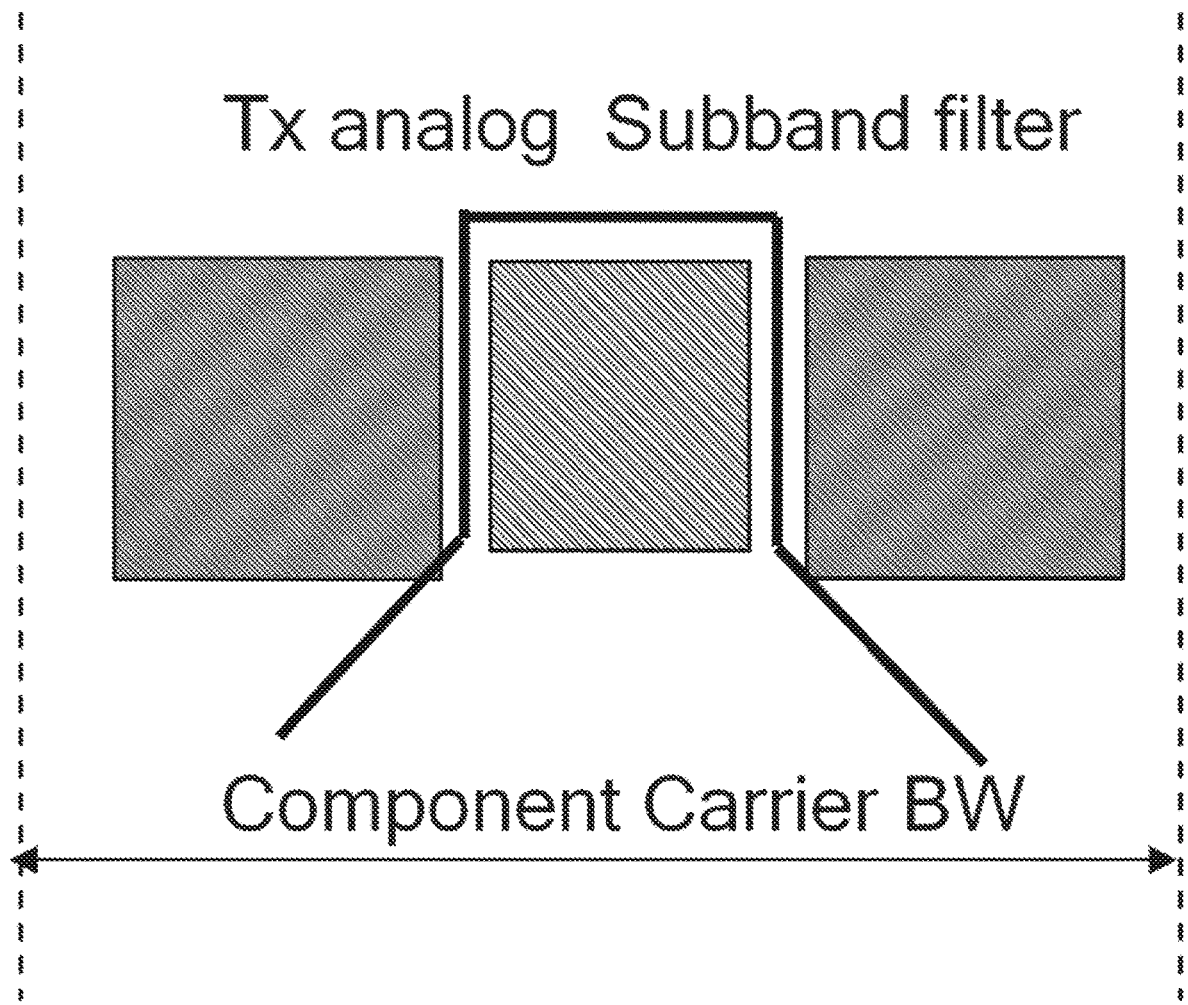
FIG. 13 depicts an example of uplink subband filtering, in accordance with aspects of the present disclosure.

In some cases, a UE may report its capability to perform subband Tx filtering, in order to meet either an SBE (IBE) mask objective or ASLR objective. In some cases, the UE may indicate to the gNB its capability of Tx subband filtering within a component carrier bandwidth (CC BW) as illustrated in FIG. 13.

In some cases, the reported capability may be defined in terms of whether the UE supports or does not support subband Tx filtering. For a UE supporting the subband filtering capability, the UE may indicate the capability according to various options. According to one option, the UE may indicate the bandwidth of the each subband, for which Tx subband filtering is supported. According to another option, the UE may indicate the minimum frequency separation to the UL subband to reject the cross-link interference (CLI). There are also various options for the granularity of reporting, for example, per CC per band combination BC), per-band per BC, or per-band.

Figure 14:
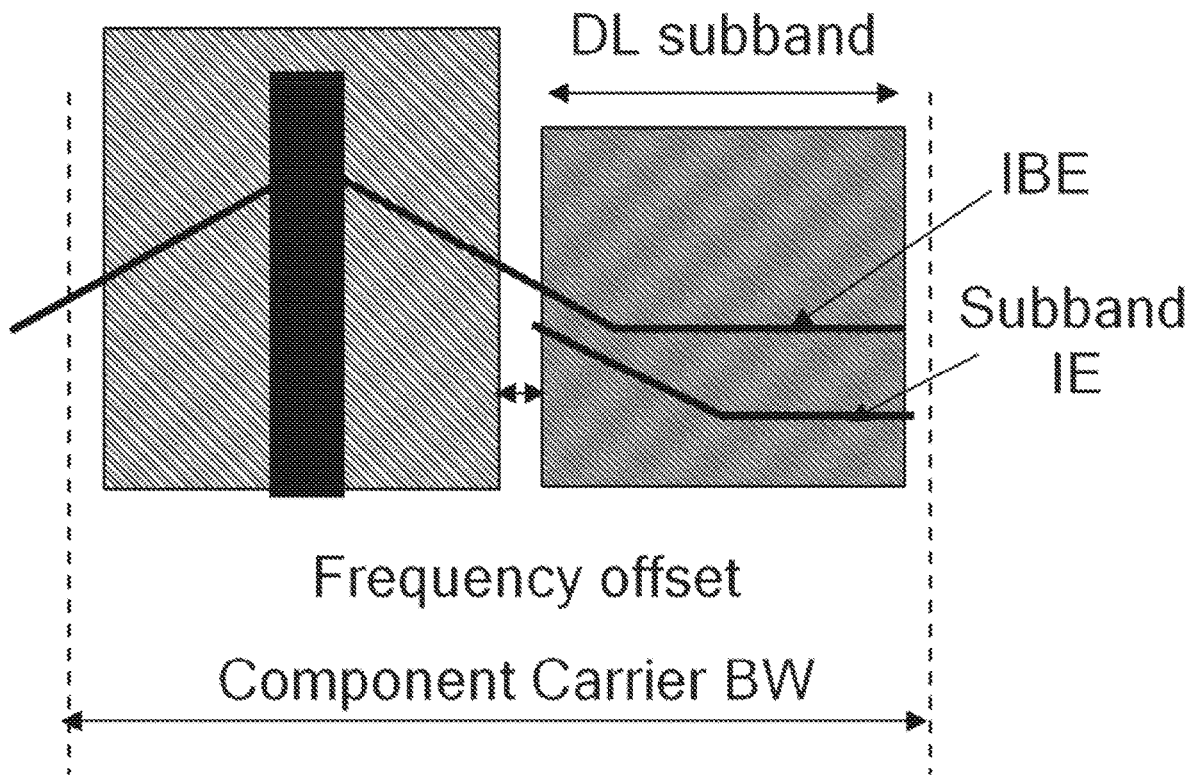
FIG. 14 depicts depict an example of subband filtering, in accordance with aspects of the present disclosure.

In some cases, new objectives (e.g., target requirements) may be defined for subband IBE in a full duplex slot. As illustrated in FIG. 14, a subband IBE may be defined similar to a spectrum emission mask (SEM). For example, the subband IBE may be defined in terms a limit of a maximum emission based on the frequency offset from the edge of the subband. In some cases, the subband IBE may not be dependent on an UL modulation or error vector magnitude (EVM). In some cases, the subband IBE may not be dependent of where the actual UL happens, within the UL subband.

Figure 15:
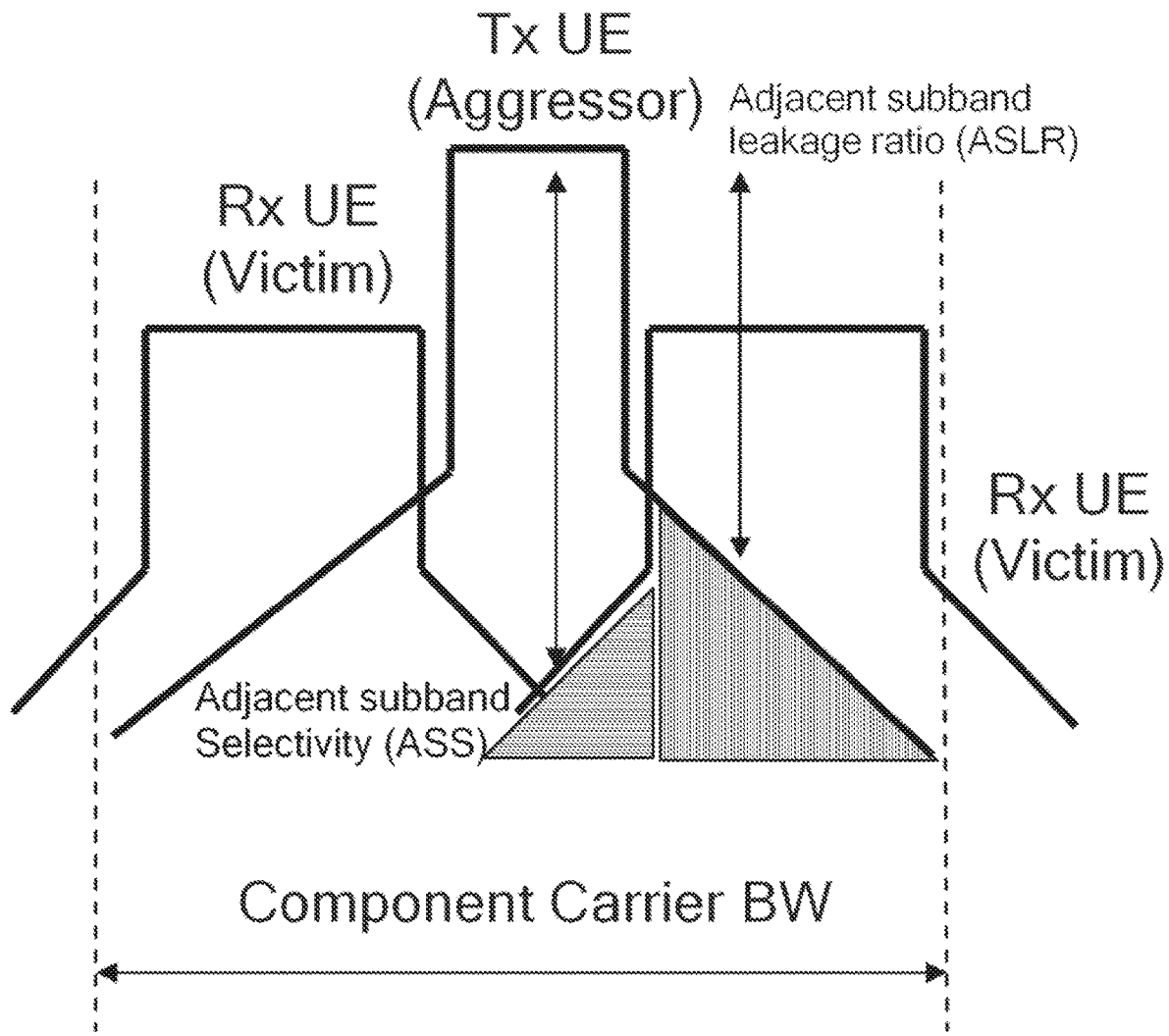
FIG. 15 depicts an example adjacent subband leakage ratio (ASLR) scenario, in accordance with aspects of the present disclosure.
Figure 16A:
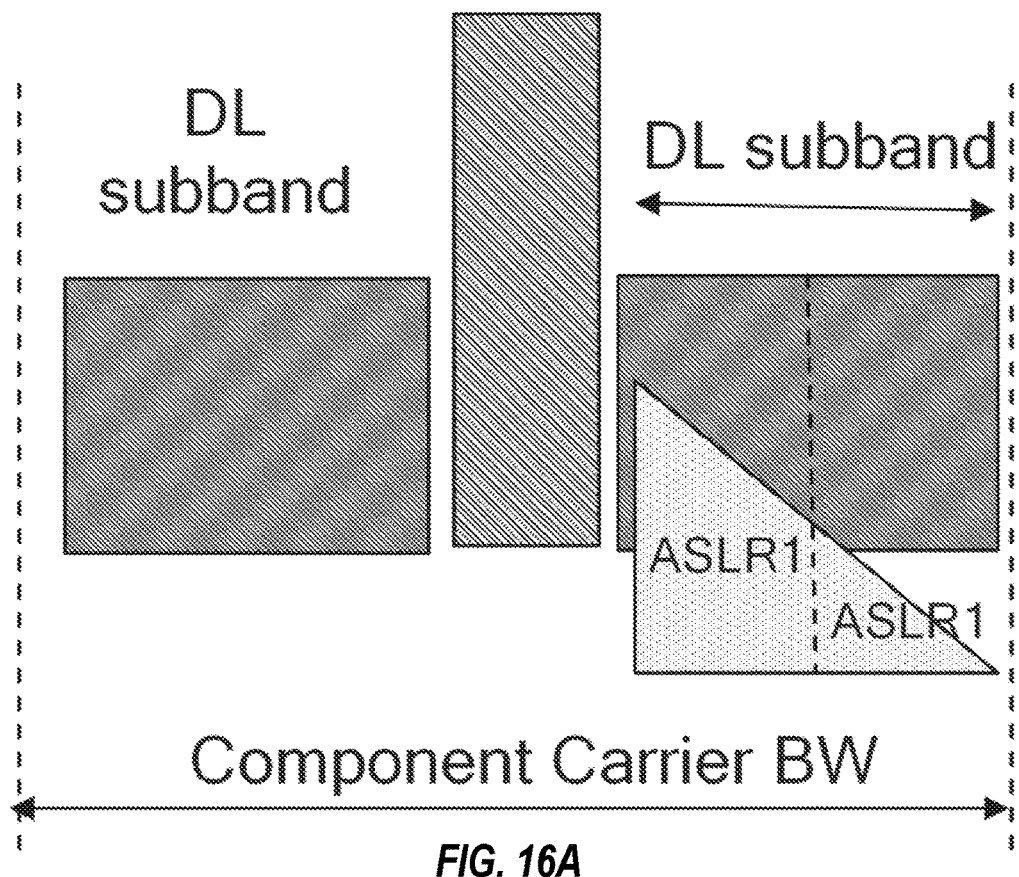
FIGS. 16A and 16B depict examples of ASLR scenarios, in accordance with aspects of the present disclosure.
Figure 16B:
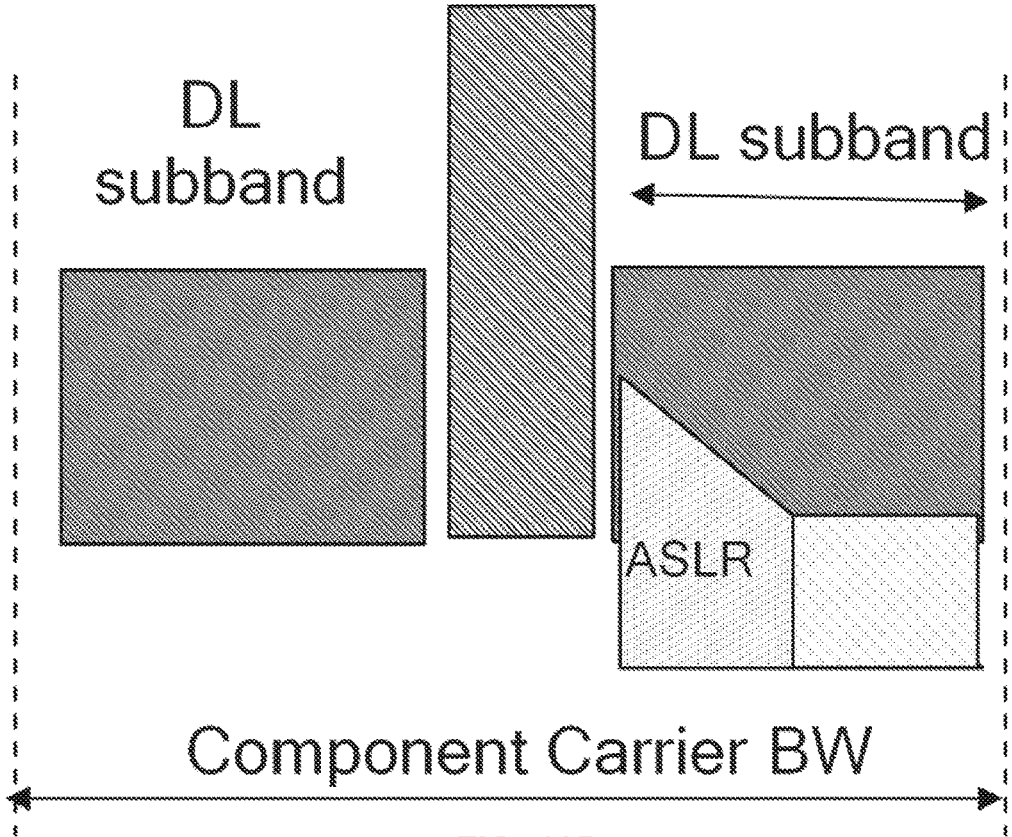

According to certain aspects, as illustrated in FIG. 15, adjacent subband leakage ratio (ASLR) objectives (or target requirements) may be defined for an adjacent subband that has a same BW as the uplink subband. In some cases, the UL subband BW may not be the same size as DL subband BW. As illustrated in FIG. 16A, according to one option, multiple ASLRs (e.g. ASLR1, ASLR2, . . . ) may be defined, for each virtual DL subband that has same BW as the UL subband. As illustrated in FIG. 16B, according to another option, an ASLR may be defined based on a same BW and a scaling factor. The scaling factor may be defined, for example, based on the BW of another DL subband and a frequency offset of the virtual DL subband to the UL subband The ASLR is a fixed number or may be variable, for example, depending on the allocation of UEs. In some cases, there could be some flexibility on having different values of ASLR based on UL allocation (e.g., inner RBs could have relaxed requirements relative to outer/edge RBs). In some cases, there could be multiple ASLR objectives (target requirements), for example, based on the TxPower. In some cases, there could also be SBFD-dependent maximum power reduction (MPR) defined to reduce the TxPower.

In some cases, there may need to be some type of defined application time for both DL subband filter and UL subband filtering (duplexer). For example, this may be desirable because a UE may need some time to tune an RF subband filter. For example, tuning time may be needed when transitioning from a TDD UL/DL only slot to an SBFD slot (or vice versa), from a single subband to dual subband, or from a first subband to a second subband.

In some cases, the timing may be defined at the slot level, for example, similar to bandwidth part (BWP) switch delay (e.g., 1 ms-3 ms). In other cases, the timing may be defined at the symbol level, for example, with one or more guard symbols (e.g., similar to antenna switching). In other cases, the timing may be in absolute time (e.g., in microseconds), similar to a defined transient period. In some cases, the timing requirement for retuning the subband filter may be included as part of the UE capability signaling.

In some cases, if a BWP is defined per each DL subband, then this timing may be absorbed within the BWP switching time. If the BWP is not defined per each DL subband (e.g., if the DL/UL subbands are within the BWP), then the timing requirements may be either reported by the UE or specified. In any case, the network (e.g., gNB) may avoid scheduling during such time.

Example Operations of a User Equipment

Figure 17:
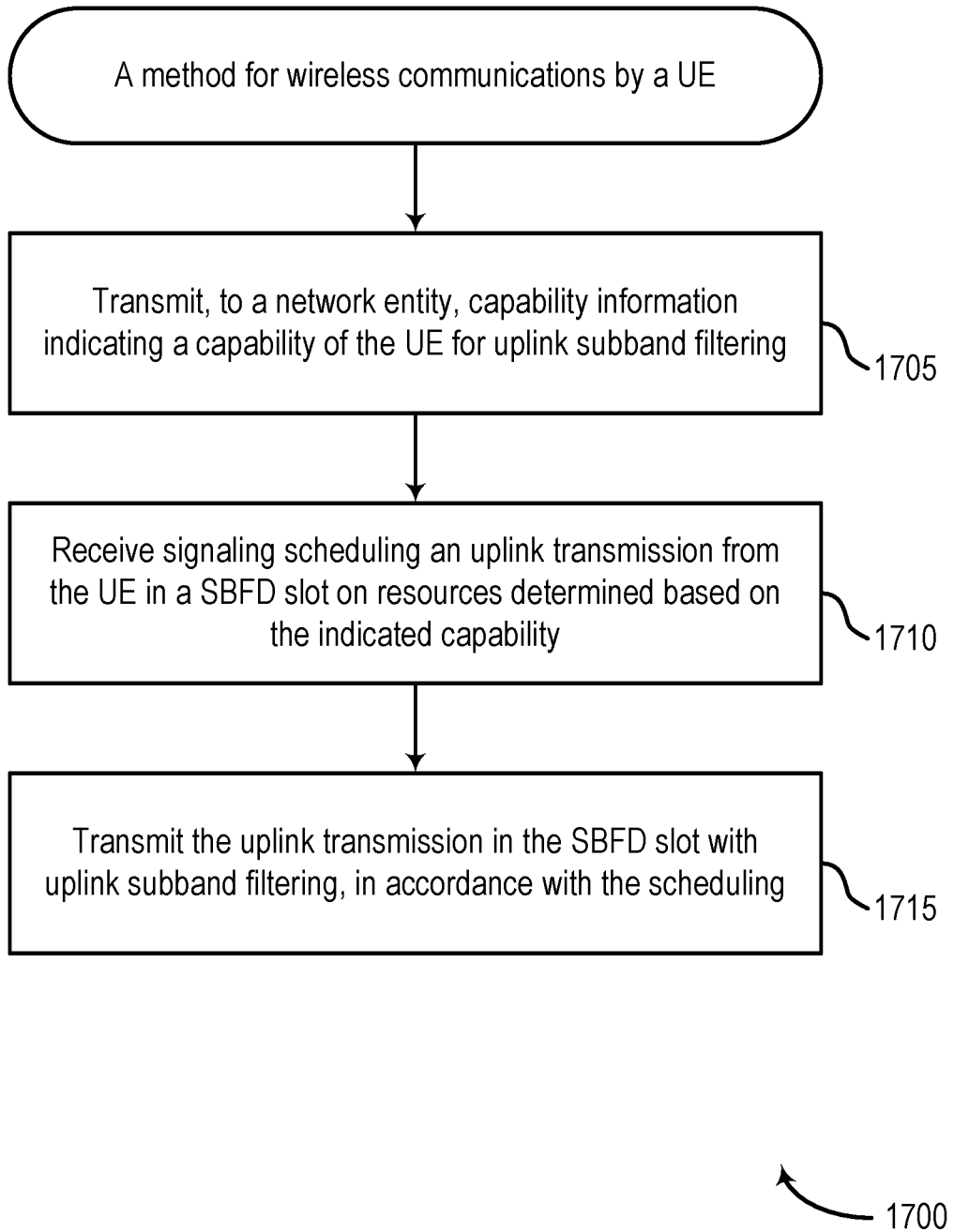
FIG. 17 depicts a method for wireless communications.

FIG. 17 shows an example of a method 1700 for wireless communications by a UE, such as a UE 104 of FIGS. 1 and 3.

Method 1700 begins at step 1705 with transmitting, to a network entity, capability information indicating a capability of the UE for uplink subband filtering. In some cases, the operations of this step refer to, or may be performed by, circuitry for transmitting and/or code for transmitting as described with reference to FIG. 19.

Method 1700 then proceeds to step 1710 with receiving signaling scheduling an uplink transmission from the UE in a SBFD slot on resources determined based on the indicated capability. In some cases, the operations of this step refer to, or may be performed by, circuitry for receiving and/or code for receiving as described with reference to FIG. 19.

Method 1700 then proceeds to step 1715 with transmitting the uplink transmission in the SBFD slot with uplink subband filtering, in accordance with the scheduling. In some cases, the operations of this step refer to, or may be performed by, circuitry for transmitting and/or code for transmitting as described with reference to FIG. 19.

In some aspects, the capability information indicates a capability of the UE to satisfy at least one of a SBE threshold or one or more ASLRs.

In some aspects, the method 1700 further includes receiving signaling that indicates at least one of the SBE threshold or the one or more ASLRs. In some cases, the operations of this step refer to, or may be performed by, circuitry for receiving and/or code for receiving as described with reference to FIG. 19.

In some aspects, the capability information indicates a capability of the UE for subband filtering for uplink transmissions in one or more subbands.

In some aspects, the capability information indicates at least one of: a bandwidth of each of the one or more subbands; or a minimum frequency separation between an uplink subband and an adjacent downlink subband.

In some aspects, the capability information applies to at least one of: a particular band; a particular BC; or a particular CC.

In some aspects, the capability information indicates a capability of the UE to satisfy at least one SBE threshold.

In some aspects, the SBE threshold is independent of at least one of uplink modulation, EVM, or a location of uplink transmissions within the subband full duplex slot.

In some aspects, the capability information indicates a capability of the UE to satisfy one or more ASLRs.

In some aspects, the one or more ASLRs comprise: multiple ASLRs for multiple virtual downlink subbands that each have a same bandwidth as an uplink subband of the SBFD slot.

In some aspects, the one or more ASLRs comprise at least one ASLR based on at least one of: a bandwidth of an uplink subband of the SBFD slot and a scale factor.

In some aspects, the scale factor is based on at least one of a bandwidth of a downlink subband or a frequency offset.

In some aspects, values of the one or more ASLRs are based on at least one of: a transmission power of the uplink transmission; or a resource allocation of the uplink transmission.

In some aspects, the method 1700 further includes decreasing the transmission power of the uplink transmission based on an SBFD-dependent MPR value. In some cases, the operations of this step refer to, or may be performed by, circuitry for decreasing and/or code for decreasing as described with reference to FIG. 19.

In some aspects, the method 1700 further includes tuning a subband filter during an application time duration that occurs before or after the scheduled uplink transmission and is indicated as part of UE capability. In some cases, the operations of this step refer to, or may be performed by, circuitry for tuning and/or code for tuning as described with reference to FIG. 19.

In some aspects, the application time duration is based on one of a fixed time duration, one or more symbols, or one or more slots.

In some aspects, the subband filter comprises an uplink subband filter or a downlink subband filter.

Figure 19:
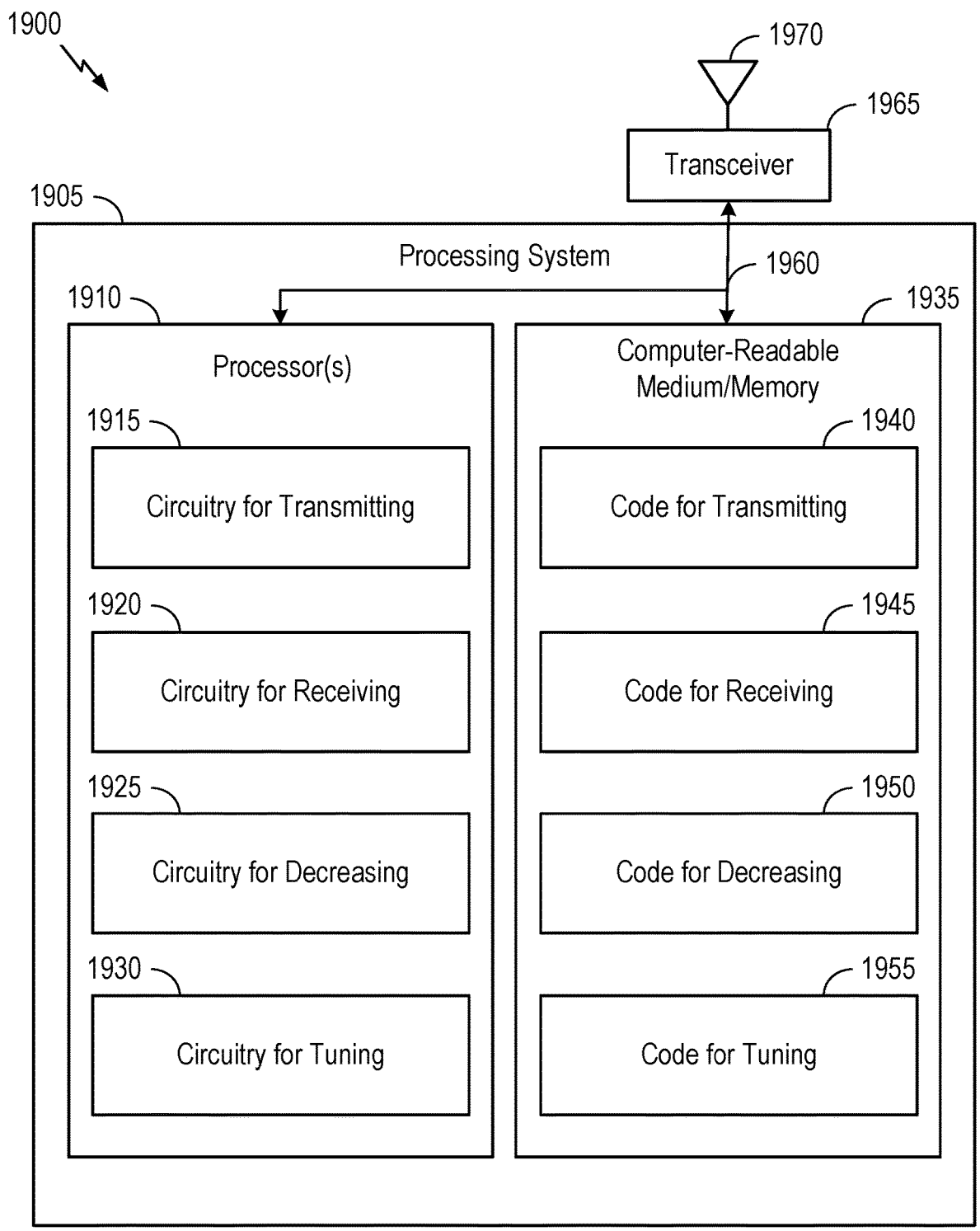
FIG. 19 depicts aspects of an example communications device.

In one aspect, method 1700, or any aspect related to it, may be performed by an apparatus, such as communications device 1900 of FIG. 19, which includes various components operable, configured, or adapted to perform the method 1700. Communications device 1900 is described below in further detail.

Note that FIG. 17 is just one example of a method, and other methods including fewer, additional, or alternative steps are possible consistent with this disclosure.

Example Operations of a Network Entity

Figure 18:
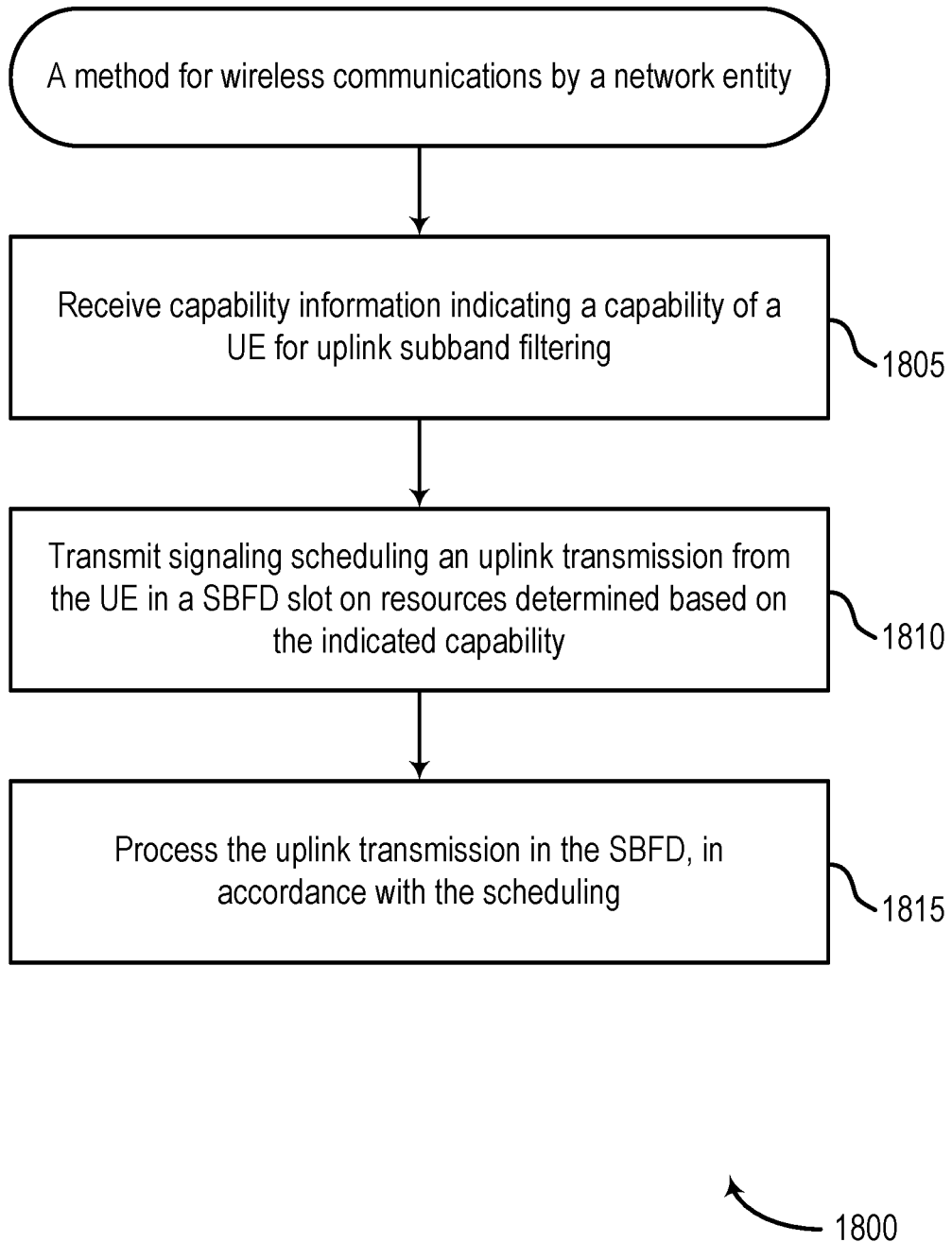
FIG. 18 depicts a method for wireless communications.

FIG. 18 shows an example of a method 1800 for wireless communications by a network entity, such as a BS 102 of FIGS. 1 and 3, or a disaggregated base station as discussed with respect to FIG. 2.

Method 1800 begins at step 1805 with receiving capability information indicating a capability of a UE for uplink subband filtering. In some cases, the operations of this step refer to, or may be performed by, circuitry for receiving and/or code for receiving as described with reference to FIG. 20.

Method 1800 then proceeds to step 1810 with transmitting signaling scheduling an uplink transmission from the UE in a SBFD slot on resources determined based on the indicated capability. In some cases, the operations of this step refer to, or may be performed by, circuitry for transmitting and/or code for transmitting as described with reference to FIG. 20.

Method 1800 then proceeds to step 1815 with processing the uplink transmission in the SBFD, in accordance with the scheduling. In some cases, the operations of this step refer to, or may be performed by, circuitry for processing and/or code for processing as described with reference to FIG. 20.

In some aspects, the capability information indicates a capability of the UE to satisfy at least one of a SBE threshold or one or more ASLRs.

In some aspects, the method 1800 further includes transmitting signaling that indicates at least one of the SBE threshold or the one or more ASLRs. In some cases, the operations of this step refer to, or may be performed by, circuitry for transmitting and/or code for transmitting as described with reference to FIG. 20.

In some aspects, the capability information indicates a capability of the UE for subband filtering for uplink transmissions in one or more subbands.

In some aspects, the capability information indicates at least one of: a bandwidth of each of the one or more subbands; or a minimum frequency separation between an uplink subband and an adjacent downlink subband.

In some aspects, the capability information applies to at least one of: a particular band; a particular BC; or a particular CC.

In some aspects, the capability information indicates a capability of the UE to satisfy at least one SBE threshold.

In some aspects, the SBE threshold is independent of at least one of uplink modulation, EVM, or a location of uplink transmissions within the subband full duplex slot.

In some aspects, the capability information indicates a capability of the UE to satisfy one or more ASLRs.

In some aspects, the one or more ASLRs comprise: multiple ASLRs for multiple virtual downlink subbands that each have a same bandwidth as an uplink subband of the SBFD slot.

In some aspects, the one or more ASLRs comprise at least one ASLR based on at least one of: a bandwidth of an uplink subband of the SBFD slot and a scale factor.

In some aspects, the scale factor is based on at least one of a bandwidth of a downlink subband or a frequency offset.

In some aspects, values of the one or more ASLRs are based on at least one of: a transmission power of the uplink transmission; or a resource allocation of the uplink transmission.

In some aspects, the UE capability indicates an application time duration for the UE to tune a subband filter.

In some aspects, the application time duration is based on one of a fixed time duration, one or more symbols, or one or more slots.

In some aspects, the subband filter comprises an uplink subband filter or a downlink subband filter.

Figure 20:
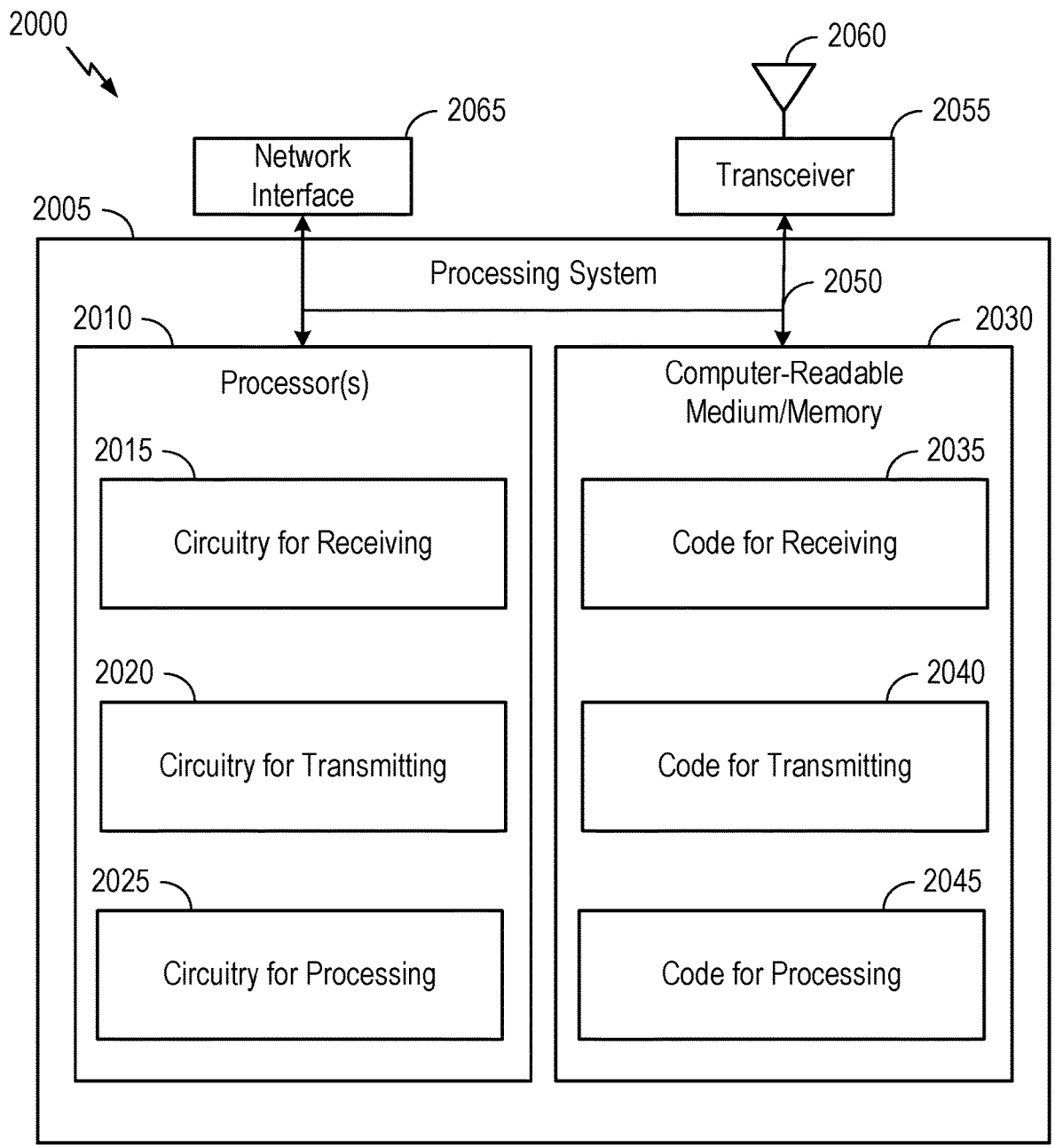
FIG. 20 depicts aspects of an example communications device.

In one aspect, method 1800, or any aspect related to it, may be performed by an apparatus, such as communications device 2000 of FIG. 20, which includes various components operable, configured, or adapted to perform the method 1800. Communications device 2000 is described below in further detail.

Note that FIG. 18 is just one example of a method, and other methods including fewer, additional, or alternative steps are possible consistent with this disclosure.

Example Communications Devices

FIG. 19 depicts aspects of an example communications device 1900. In some aspects, communications device 1900 is a user equipment, such as a UE 104 described above with respect to FIGS. 1 and 3.

The communications device 1900 includes a processing system 1905 coupled to the transceiver 1965 (e.g., a transmitter and/or a receiver). The transceiver 1965 is configured to transmit and receive signals for the communications device 1900 via the antenna 1970, such as the various signals as described herein. The processing system 1905 may be configured to perform processing functions for the communications device 1900, including processing signals received and/or to be transmitted by the communications device 1900.

The processing system 1905 includes one or more processors 1910. In various aspects, the one or more processors 1910 may be representative of one or more of receive processor 358, transmit processor 364, TX MIMO processor 366, and/or controller/processor 380, as described with respect to FIG. 3. The one or more processors 1910 are coupled to a computer-readable medium/memory 1935 via a bus 1960. In certain aspects, the computer-readable medium/memory 1935 is configured to store instructions (e.g., computer-executable code) that when executed by the one or more processors 1910, cause the one or more processors 1910 to perform the method 1700 described with respect to FIG. 17, or any aspect related to it. Note that reference to a processor performing a function of communications device 1900 may include one or more processors 1910 performing that function of communications device 1900.

In the depicted example, computer-readable medium/memory 1935 stores code (e.g., executable instructions), such as code for transmitting 1940, code for receiving 1945, code for decreasing 1950, and code for tuning 1955. Processing of the code for transmitting 1940, code for receiving 1945, code for decreasing 1950, and code for tuning 1955 may cause the communications device 1900 to perform the method 1700 described with respect to FIG. 17, or any aspect related to it.

The one or more processors 1910 include circuitry configured to implement (e.g., execute) the code stored in the computer-readable medium/memory 1935, including circuitry such as circuitry for transmitting 1915, circuitry for receiving 1920, circuitry for decreasing 1925, and circuitry for tuning 1930. Processing with circuitry for transmitting 1915, circuitry for receiving 1920, circuitry for decreasing 1925, and circuitry for tuning 1930 may cause the communications device 1900 to perform the method 1700 described with respect to FIG. 17, or any aspect related to it.

Various components of the communications device 1900 may provide means for performing the method 1700 described with respect to FIG. 17, or any aspect related to it. For example, means for transmitting, sending or outputting for transmission may include transceivers 354 and/or antenna(s) 352 of the UE 104 illustrated in FIG. 3 and/or the transceiver 1965 and the antenna 1970 of the communications device 1900 in FIG. 19. Means for receiving or obtaining may include transceivers 354 and/or antenna(s) 352 of the UE 104 illustrated in FIG. 3 and/or the transceiver 1965 and the antenna 1970 of the communications device 1900 in FIG. 19.

FIG. 20 depicts aspects of an example communications device 2000. In some aspects, communications device 2000 is a network entity, such as a BS 102 of FIGS. 1 and 3, or a disaggregated base station as discussed with respect to FIG. 2.

The communications device 2000 includes a processing system 2005 coupled to the transceiver 2055 (e.g., a transmitter and/or a receiver) and/or a network interface 2065. The transceiver 2055 is configured to transmit and receive signals for the communications device 2000 via the antenna 2060, such as the various signals as described herein. The network interface 2065 is configured to obtain and send signals for the communications device 2000 via communication link(s), such as a backhaul link, midhaul link, and/or fronthaul link as described herein, such as with respect to FIG. 2. The processing system 2005 may be configured to perform processing functions for the communications device 2000, including processing signals received and/or to be transmitted by the communications device 2000.

The processing system 2005 includes one or more processors 2010. In various aspects, one or more processors 2010 may be representative of one or more of receive processor 338, transmit processor 320, TX MIMO processor 330, and/or controller/processor 340, as described with respect to FIG. 3. The one or more processors 2010 are coupled to a computer-readable medium/memory 2030 via a bus 2050. In certain aspects, the computer-readable medium/memory 2030 is configured to store instructions (e.g., computer-executable code) that when executed by the one or more processors 2010, cause the one or more processors 2010 to perform the method 1800 described with respect to FIG. 18, or any aspect related to it. Note that reference to a processor of communications device 2000 performing a function may include one or more processors 2010 of communications device 2000 performing that function.

In the depicted example, the computer-readable medium/memory 2030 stores code (e.g., executable instructions), such as code for receiving 2035, code for transmitting 2040, and code for processing 2045. Processing of the code for receiving 2035, code for transmitting 2040, and code for processing 2045 may cause the communications device 2000 to perform the method 1800 described with respect to FIG. 18, or any aspect related to it.

The one or more processors 2010 include circuitry configured to implement (e.g., execute) the code stored in the computer-readable medium/memory 2030, including circuitry such as circuitry for receiving 2015, circuitry for transmitting 2020, and circuitry for processing 2025. Processing with circuitry for receiving 2015, circuitry for transmitting 2020, and circuitry for processing 2025 may cause the communications device 2000 to perform the method 1800 as described with respect to FIG. 18, or any aspect related to it.

Various components of the communications device 2000 may provide means for performing the method 1800 as described with respect to FIG. 18, or any aspect related to it. Means for transmitting, sending or outputting for transmission may include transceivers 332 and/or antenna(s) 334 of the BS 102 illustrated in FIG. 3 and/or the transceiver 2055 and the antenna 2060 of the communications device 2000 in FIG. 20. Means for receiving or obtaining may include transceivers 332 and/or antenna(s) 334 of the BS 102 illustrated in FIG. 3 and/or the transceiver 2055 and the antenna 2060 of the communications device 2000 in FIG. 20.

Example Clauses

Implementation examples are described in the following numbered clauses:

Clause 1: A method for wireless communications by a UE comprising: transmitting, to a network entity, capability information indicating a capability of the UE for uplink subband filtering; receiving signaling scheduling an uplink transmission from the UE in a SBFD slot on resources determined based on the indicated capability; and transmitting the uplink transmission in the SBFD slot with uplink subband filtering, in accordance with the scheduling.

Clause 2: The method of Clause 1, wherein the capability information indicates a capability of the UE to satisfy at least one of a SBE threshold or one or more ASLRs.

Clause 3: The method of Clause 2, further comprising: receiving signaling that indicates at least one of the SBE threshold or the one or more ASLRs.

Clause 4: The method of any one of Clauses 1-3, wherein the capability information indicates a capability of the UE for subband filtering for uplink transmissions in one or more subbands.

Clause 5: The method of Clause 4, wherein the capability information indicates at least one of: a bandwidth of each of the one or more subbands; or a minimum frequency separation between an uplink subband and an adjacent downlink subband.

Clause 6: The method of any one of Clauses 1-5, wherein the capability information applies to at least one of: a particular band; a particular BC; or a particular CC.

Clause 7: The method of any one of Clauses 1-6, wherein the capability information indicates a capability of the UE to satisfy at least one SBE threshold.

Clause 8: The method of Clause 7, wherein the SBE threshold is independent of at least one of uplink modulation, EVM, or a location of uplink transmissions within the subband full duplex slot.

Clause 9: The method of any one of Clauses 1-8, wherein the capability information indicates a capability of the UE to satisfy one or more ASLRs.

Clause 10: The method of Clause 9, wherein the one or more ASLRs comprise: multiple ASLRs for multiple virtual downlink subbands that each have a same bandwidth as an uplink subband of the SBFD slot.

Clause 11: The method of Clause 9, wherein the one or more ASLRs comprise at least one ASLR based on at least one of: a bandwidth of an uplink subband of the SBFD slot and a scale factor.

Clause 12: The method of Clause 11, wherein the scale factor is based on at least one of a bandwidth of a downlink subband or a frequency offset.

Clause 13: The method of Clause 9, wherein values of the one or more ASLRs are based on at least one of: a transmission power of the uplink transmission; or a resource allocation of the uplink transmission.

Clause 14: The method of Clause 13, further comprising: decreasing the transmission power of the uplink transmission based on an SBFD-dependent MPR value.

Clause 15: The method of any one of Clauses 1-14, further comprising: tuning a subband filter during an application time duration that occurs before or after the scheduled uplink transmission and is indicated as part of UE capability.

Clause 16: The method of Clause 15, wherein the application time duration is based on one of a fixed time duration, one or more symbols, or one or more slots.

Clause 17: The method of Clause 15, wherein the subband filter comprises an uplink subband filter or a downlink subband filter.

Clause 18: A method for wireless communications by a network entity comprising: receiving capability information indicating a capability of a UE for uplink subband filtering; transmitting signaling scheduling an uplink transmission from the UE in a SBFD slot on resources determined based on the indicated capability; and processing the uplink transmission in the SBFD, in accordance with the scheduling.

Clause 19: The method of Clause 18, wherein the capability information indicates a capability of the UE to satisfy at least one of a SBE threshold or one or more ASLRs.

Clause 20: The method of Clause 19, further comprising: transmitting signaling that indicates at least one of the SBE threshold or the one or more ASLRs.

Clause 21: The method of any one of Clauses 18-20, wherein the capability information indicates a capability of the UE for subband filtering for uplink transmissions in one or more subbands.

Clause 22: The method of Clause 21, wherein the capability information indicates at least one of: a bandwidth of each of the one or more subbands; or a minimum frequency separation between an uplink subband and an adjacent downlink subband.

Clause 23: The method of any one of Clauses 18-22, wherein the capability information applies to at least one of: a particular band; a particular BC; or a particular CC.

Clause 24: The method of any one of Clauses 18-23, wherein the capability information indicates a capability of the UE to satisfy at least one SBE threshold.

Clause 25: The method of Clause 24, wherein the SBE threshold is independent of at least one of uplink modulation, EVM, or a location of uplink transmissions within the subband full duplex slot.

Clause 26: The method of any one of Clauses 18-25, wherein the capability information indicates a capability of the UE to satisfy one or more ASLRs.

Clause 27: The method of Clause 26, wherein the one or more ASLRs comprise: multiple ASLRs for multiple virtual downlink subbands that each have a same bandwidth as an uplink subband of the SBFD slot.

Clause 28: The method of Clause 26, wherein the one or more ASLRs comprise at least one ASLR based on at least one of: a bandwidth of an uplink subband of the SBFD slot and a scale factor.

Clause 29: The method of Clause 28, wherein the scale factor is based on at least one of a bandwidth of a downlink subband or a frequency offset.

Clause 30: The method of Clause 26, wherein values of the one or more ASLRs are based on at least one of: a transmission power of the uplink transmission; or a resource allocation of the uplink transmission.

Clause 31: The method of any one of Clauses 18-30, wherein the UE capability indicates an application time duration for the UE to tune a subband filter.

Clause 32: The method of Clause 31, wherein the application time duration is based on one of a fixed time duration, one or more symbols, or one or more slots.

Clause 33: The method of Clause 31, wherein the subband filter comprises an uplink subband filter or a downlink subband filter.

Clause 34: An apparatus, comprising: a memory comprising executable instructions; and a processor configured to execute the executable instructions and cause the apparatus to perform a method in accordance with any one of Clauses 1-33.

Clause 35: An apparatus, comprising means for performing a method in accordance with any one of Clauses 1-33.

Clause 36: A non-transitory computer-readable medium comprising executable instructions that, when executed by a processor of an apparatus, cause the apparatus to perform a method in accordance with any one of Clauses 1-33.

Clause 37: A computer program product embodied on a computer-readable storage medium comprising code for performing a method in accordance with any one of Clauses 1-33.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising:
    memory comprising computer-executable instructions; and
    one or more processors configured, individually or collectively, to execute the computer-executable instructions and cause the apparatus to:
        transmit, to a network entity, capability information indicating a capability of the UE for uplink subband filtering;
        receive signaling scheduling an uplink transmission from the UE in a subband full duplex (SBFD) slot on resources determined based on the indicated capability; and
        transmit the uplink transmission in the SBFD slot with uplink subband filtering, in accordance with the scheduling.

2. The apparatus of claim 1, wherein the capability information indicates a capability of the UE to satisfy at least one of a subband emission (SBE) threshold or one or more adjacent subband leakage ratio (ASLRs).

3. The apparatus of claim 2, wherein the one or more processors are configured, individually or collectively, to execute the computer-executable instructions and further cause the apparatus to receive signaling that indicates at least one of the SBE threshold or the one or more ASLRs.

4. The apparatus of claim 1, wherein the capability information indicates a capability of the UE for subband filtering for uplink transmissions in one or more subbands.

5. The apparatus of claim 4, wherein the capability information indicates at least one of:
    a bandwidth of each of the one or more subbands; or
    a minimum frequency separation between an uplink subband and an adjacent downlink subband.

6. The apparatus of claim 1, wherein the capability information applies to at least one of:
    a particular band;
    a particular band combination (BC); or
    a particular component carrier (CC).

7. The apparatus of claim 1, wherein the capability information indicates a capability of the UE to satisfy at least one subband emission (SBE) threshold.

8. The apparatus of claim 7, wherein the SBE threshold is independent of at least one of uplink modulation, error vector magnitude (EVM), or a location of uplink transmissions within the subband full duplex slot.

9. The apparatus of claim 1, wherein the capability information indicates a capability of the UE to satisfy one or more adjacent subband leakage ratios (ASLRs).

10. The apparatus of claim 9, wherein the one or more ASLRs comprise:
    multiple ASLRs for multiple virtual downlink subbands that each have a same bandwidth as an uplink subband of the SBFD slot.

11. The apparatus of claim 9, wherein the one or more ASLRs comprise at least one ASLR based on at least one of: a bandwidth of an uplink subband of the SBFD slot and a scale factor.

12. The apparatus of claim 11, wherein the scale factor is based on at least one of a bandwidth of a downlink subband or a frequency offset.

13. The apparatus of claim 9, wherein values of the one or more ASLRs are based on at least one of:
    a transmission power of the uplink transmission; or
    a resource allocation of the uplink transmission.

14. The apparatus of claim 13, wherein the one or more processors are configured, individually or collectively, to execute the computer-executable instructions and further cause the apparatus to decrease the transmission power of the uplink transmission based on an SBFD-dependent maximum power reduction (MPR) value.

15. The apparatus of claim 1, wherein the one or more processors are configured, individually or collectively, to execute the computer-executable instructions and further cause the apparatus to tune a subband filter during an application time duration that occurs before or after the scheduled uplink transmission and is indicated as part of UE capability.

16. The apparatus of claim 15, wherein the application time duration is based on one of a fixed time duration, one or more symbols, or one or more slots.

17. The apparatus of claim 15, wherein the subband filter comprises an uplink subband filter or a downlink subband filter.

18. An apparatus for wireless communication at a network entity, comprising:
  memory comprising computer-executable instructions; and
  one or more processors configured, individually or collectively, to execute the computer-executable instructions and cause the apparatus to:
    receive capability information indicating a capability of a user equipment (UE) for uplink subband filtering;
    transmit signaling scheduling an uplink transmission from the UE in a subband full duplex (SBFD) slot on resources determined based on the indicated capability; and
    process the uplink transmission in the SBFD, in accordance with the scheduling.

19. The apparatus of claim 18, wherein the capability information indicates a capability of the UE to satisfy at least one of a subband emission (SBE) threshold or one or more adjacent subband leakage ratio (ASLRs).

20. The apparatus of claim 19, wherein the one or more processors are configured, individually or collectively, to execute the computer-executable instructions and further cause the apparatus to transmit signaling that indicates at least one of the SBE threshold or the one or more ASLRs.

21. The apparatus of claim 18, wherein the capability information indicates a capability of the UE for subband filtering for uplink transmissions in one or more subbands.

22. The apparatus of claim 21, wherein the capability information indicates at least one of:
  a bandwidth of each of the one or more subbands; or
  a minimum frequency separation between an uplink subband and an adjacent downlink subband.

23. The apparatus of claim 18, wherein the capability information applies to at least one of:
  a particular band;
  a particular band combination (BC); or
  a particular component carrier (CC).

24. The apparatus of claim 18, wherein the capability information indicates a capability of the UE to satisfy at least one subband emission (SBE) threshold.

25. The apparatus of claim 24, wherein the SBE threshold is independent of at least one of uplink modulation, error vector magnitude (EVM), or a location of uplink transmissions within the subband full duplex slot.

26. The apparatus of claim 18, wherein the capability information indicates a capability of the UE to satisfy one or more adjacent subband leakage ratios (ASLRs).

27. The apparatus of claim 26, wherein the one or more ASLRs comprise:
  multiple ASLRs for multiple virtual downlink subbands that each have a same bandwidth as an uplink subband of the SBFD slot.

28. The apparatus of claim 26, wherein the one or more ASLRs comprise at least one ASLR based on at least one of: a bandwidth of an uplink subband of the SBFD slot and a scale factor.

29. The apparatus of claim 28, wherein the scale factor is based on at least one of a bandwidth of a downlink subband or a frequency offset.

30. The apparatus of claim 26, wherein values of the one or more ASLRs are based on at least one of:
  a transmission power of the uplink transmission; or
  a resource allocation of the uplink transmission.

31. The apparatus of claim 18, wherein the UE capability indicates an application time duration for the UE to tune a subband filter.

32. The apparatus of claim 31, wherein the application time duration is based on one of a fixed time duration, one or more symbols, or one or more slots.

33. The apparatus of claim 31, wherein the subband filter comprises an uplink subband filter or a downlink subband filter.

34. A method for wireless communication at a user equipment (UE), comprising:
  transmitting, to a network entity, capability information indicating a capability of the UE for uplink subband filtering;
  receiving signaling scheduling an uplink transmission from the UE in a subband full duplex (SBFD) slot on resources determined based on the indicated capability; and
  transmitting the uplink transmission in the SBFD slot with uplink subband filtering, in accordance with the scheduling.

35. A method for wireless communication at a network entity, comprising:
  receiving capability information indicating a capability of a user equipment (UE) for uplink subband filtering;
  transmitting signaling scheduling an uplink transmission from the UE in a subband full duplex (SBFD) slot on resources determined based on the indicated capability; and
  processing the uplink transmission in the SBFD, in accordance with the scheduling.

* * * * *